US012608821B2

(12) United States Patent
Horikawa

(10) Patent No.: US 12,608,821 B2
(45) Date of Patent: Apr. 21, 2026

(54) IMAGE PROCESSING APPARATUS, TRAINING APPARATUS, IMAGE PROCESSING METHOD, TRAINING METHOD, AND NON-TRANSITORY COMPUTER-READABLE MEDIUM

(71) Applicant: CANON KABUSHIKI KAISHA, Tokyo (JP)

(72) Inventor: Yuta Horikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 323 days.

(21) Appl. No.: 18/462,485

(22) Filed: Sep. 7, 2023

(65) Prior Publication Data

US 2024/0095934 A1     Mar. 21, 2024

(30) Foreign Application Priority Data

Sep. 15, 2022     (JP) ................................. 2022-147206

(51) Int. Cl.
*G06K 9/00*          (2022.01)
*G06T 7/246*        (2017.01)

(52) U.S. Cl.
CPC .... *G06T 7/248* (2017.01); *G06T 2207/20081* (2013.01); *G06T 2207/20084* (2013.01)

(58) Field of Classification Search
CPC ........... G06T 7/248; G06T 2207/20081; G06T 2207/20084
See application file for complete search history.

(56) References Cited

U.S. PATENT DOCUMENTS

2024/0005528 A1     1/2024  Horikawa

FOREIGN PATENT DOCUMENTS

| CN | 113850843 A | * | 12/2021 | ............. G06N 3/045 |
| EP | 3968280 A1 | * | 3/2022 | .......... G06V 10/431 |
| JP | 2021-103598 A | | 7/2021 | |
| WO | WO-2021223367 A1 | * | 11/2021 | ............... G06T 7/74 |

OTHER PUBLICATIONS

Li, B. et al. "High Performance Visual Tracking with Siamese Region Proposal Network" IEEE Conference on Computer Vision and Pattern Recognition (CVPR) (Jun. 2018) pp. 8971-8980.
Zhou, X. et al. "Objects as Points" arXiv:1904.07850v2 (Apr. 2019) pp. 1-12.
Farnebaek, G., "Two-Frame Motion Estimation Based on Polynomial Expansion" Scandinavian Conference on Image Analysis (Jan. 2003) pp. 1-8.

* cited by examiner

*Primary Examiner* — Xin Jia
(74) *Attorney, Agent, or Firm* — Carter, DeLuca & Farrell LLP

(57) ABSTRACT

An image processing apparatus is provided. The image processing apparatus searches for a tracking target from a target image. A feature of the target image and a feature of a first image of the tracking target at a first time are acquired. A weight of a feature for each of a plurality of positions of the first image of the tracking target is generated on the basis of the first image of the tracking target and a second image of the tracking target at a second time. The tracking target is detected from the target image on the basis of a correlation between a feature of the target image and a feature of a first image of the tracking target weighted on the basis of the weight.

22 Claims, 22 Drawing Sheets

F I G. 1
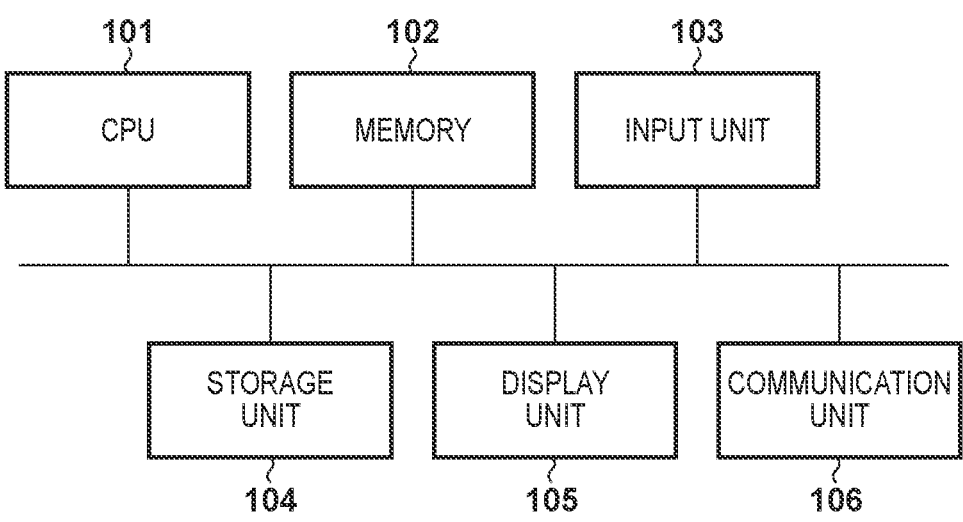

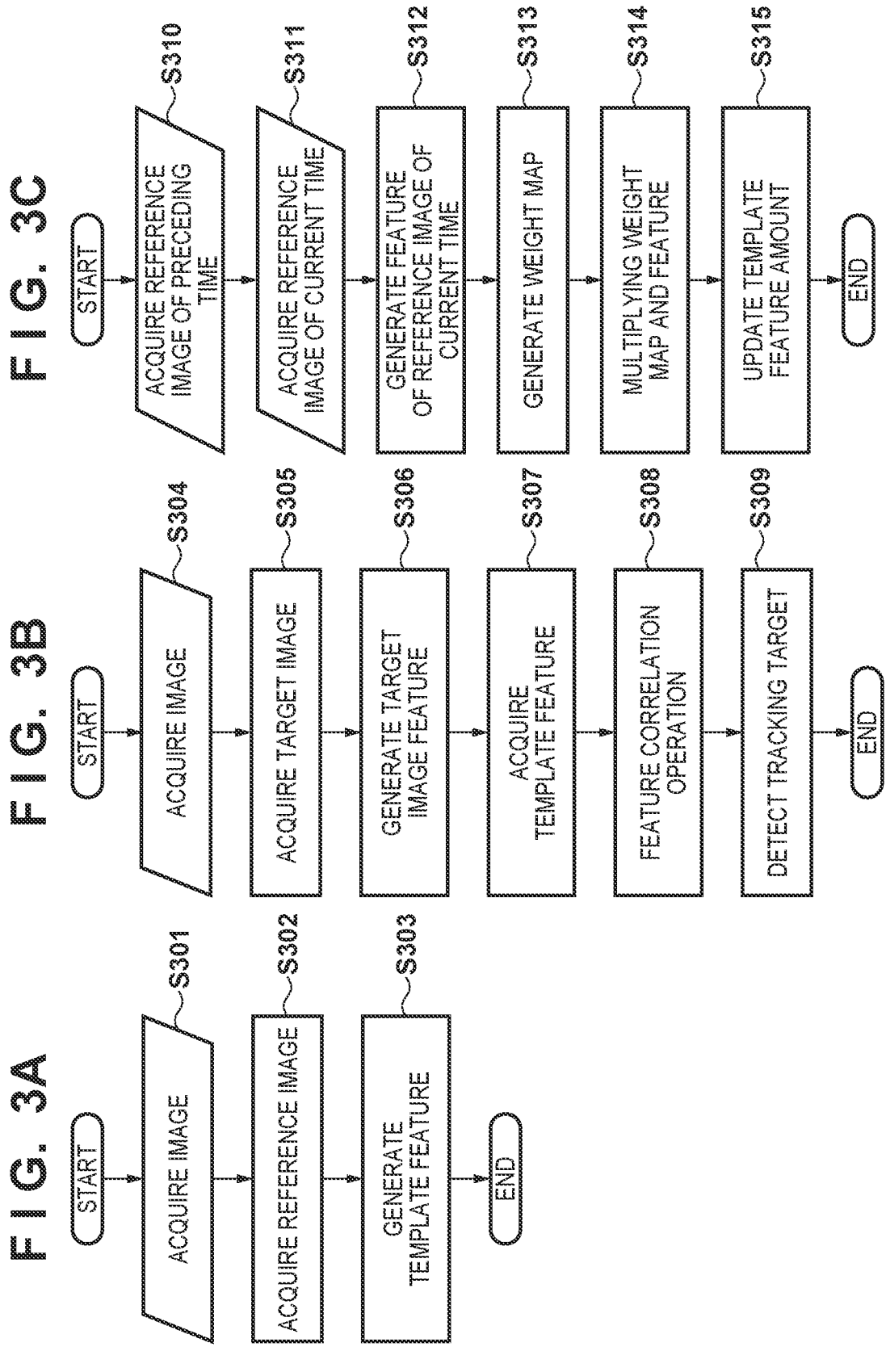

FIG. 3A

START

ACQUIRE IMAGE ～S301

ACQUIRE REFERENCE IMAGE ～S302

GENERATE TEMPLATE FEATURE ～S303

END

FIG. 3B

START

ACQUIRE IMAGE ～S304

ACQUIRE TARGET IMAGE ～S305

GENERATE TARGET IMAGE FEATURE ～S306

ACQUIRE TEMPLATE FEATURE ～S307

FEATURE CORRELATION OPERATION ～S308

DETECT TRACKING TARGET ～S309

END

FIG. 3C

START

ACQUIRE REFERENCE IMAGE OF PRECEDING TIME ～S310

ACQUIRE REFERENCE IMAGE OF CURRENT TIME ～S311

GENERATE FEATURE OF REFERENCE IMAGE OF CURRENT TIME ～S312

GENERATE WEIGHT MAP ～S313

MULTIPLYING WEIGHT MAP AND FEATURE ～S314

UPDATE TEMPLATE FEATURE AMOUNT ～S315

END

F I G. 4

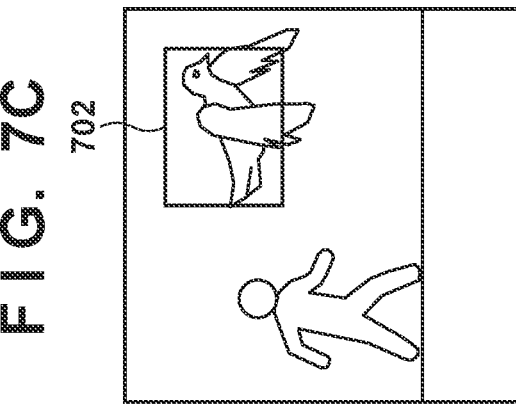
FIG. 7C
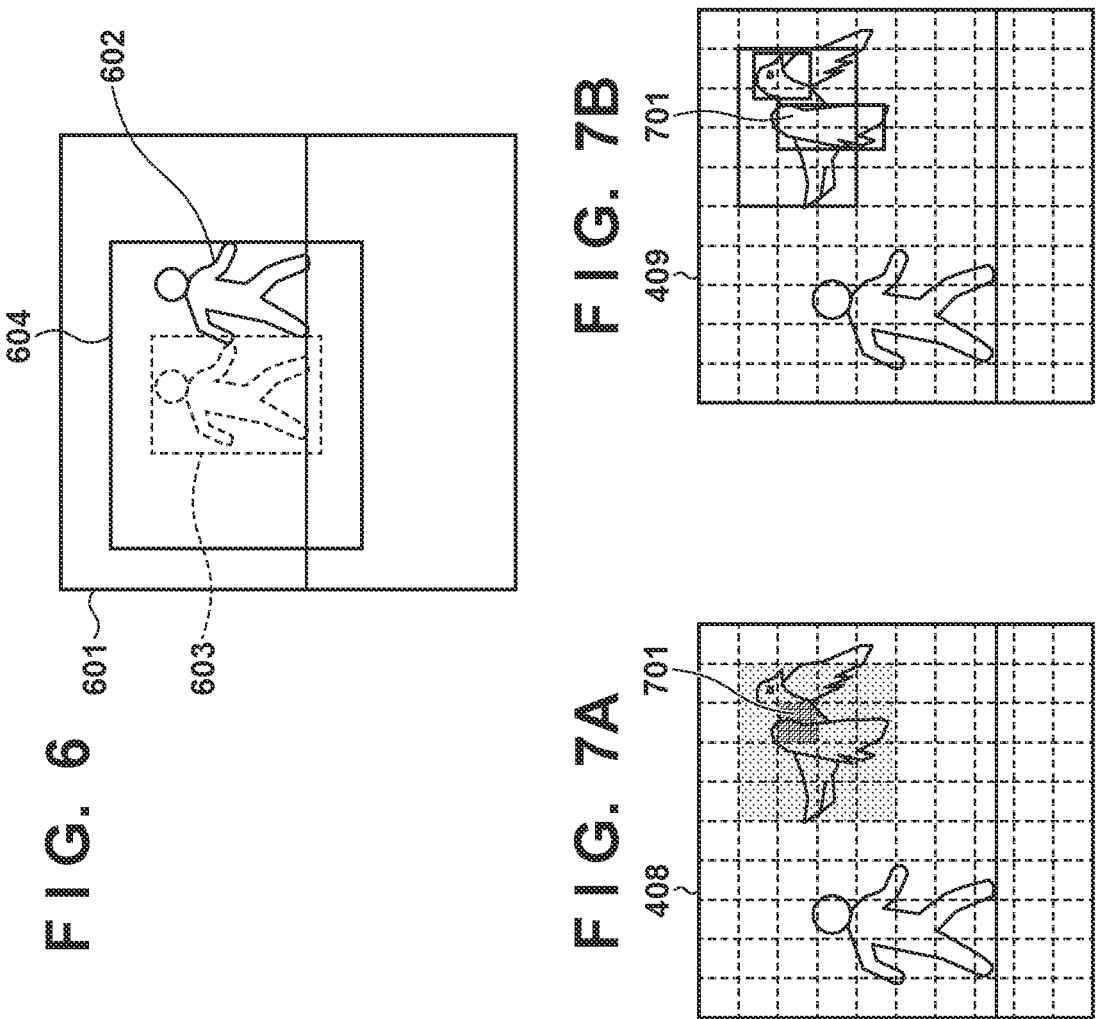
FIG. 6
FIG. 7B
FIG. 7A

F I G. 11
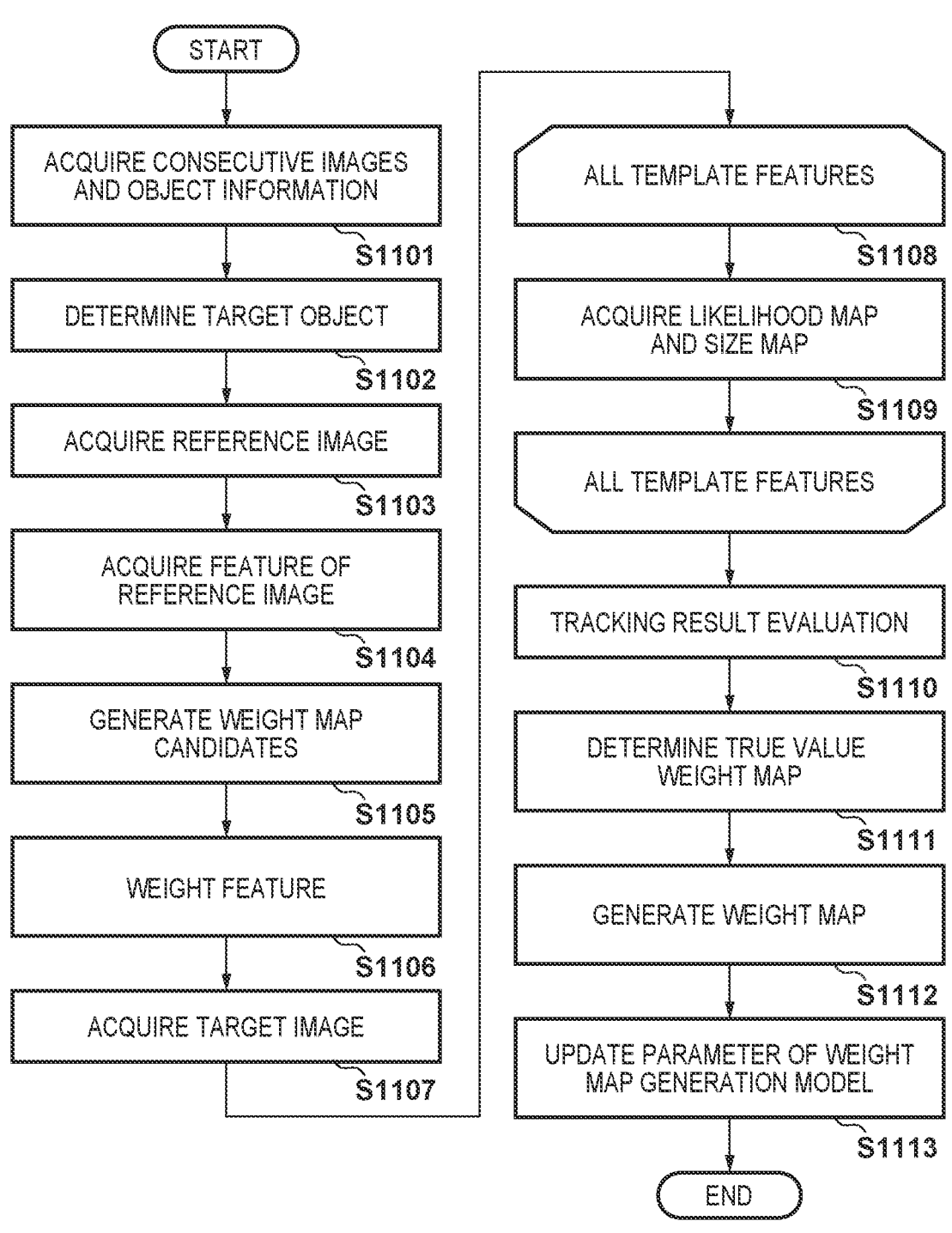

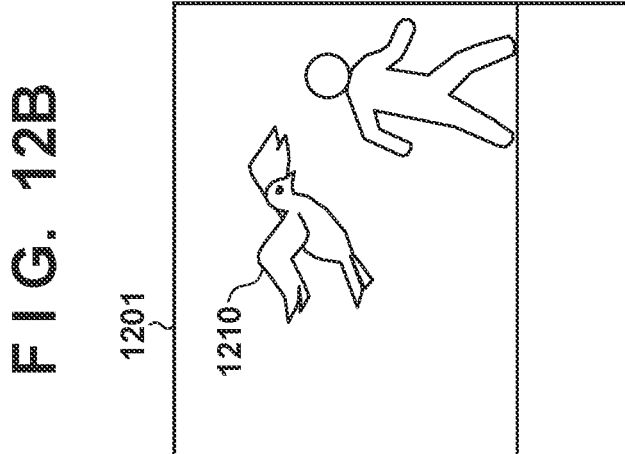
FIG. 12C
FIG. 12B
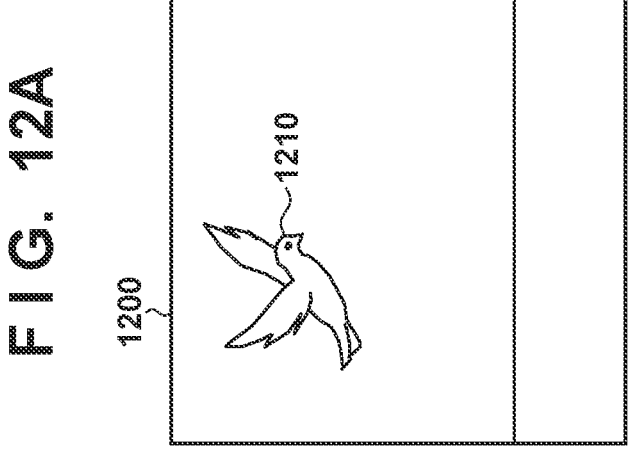
FIG. 12A

FIG. 14

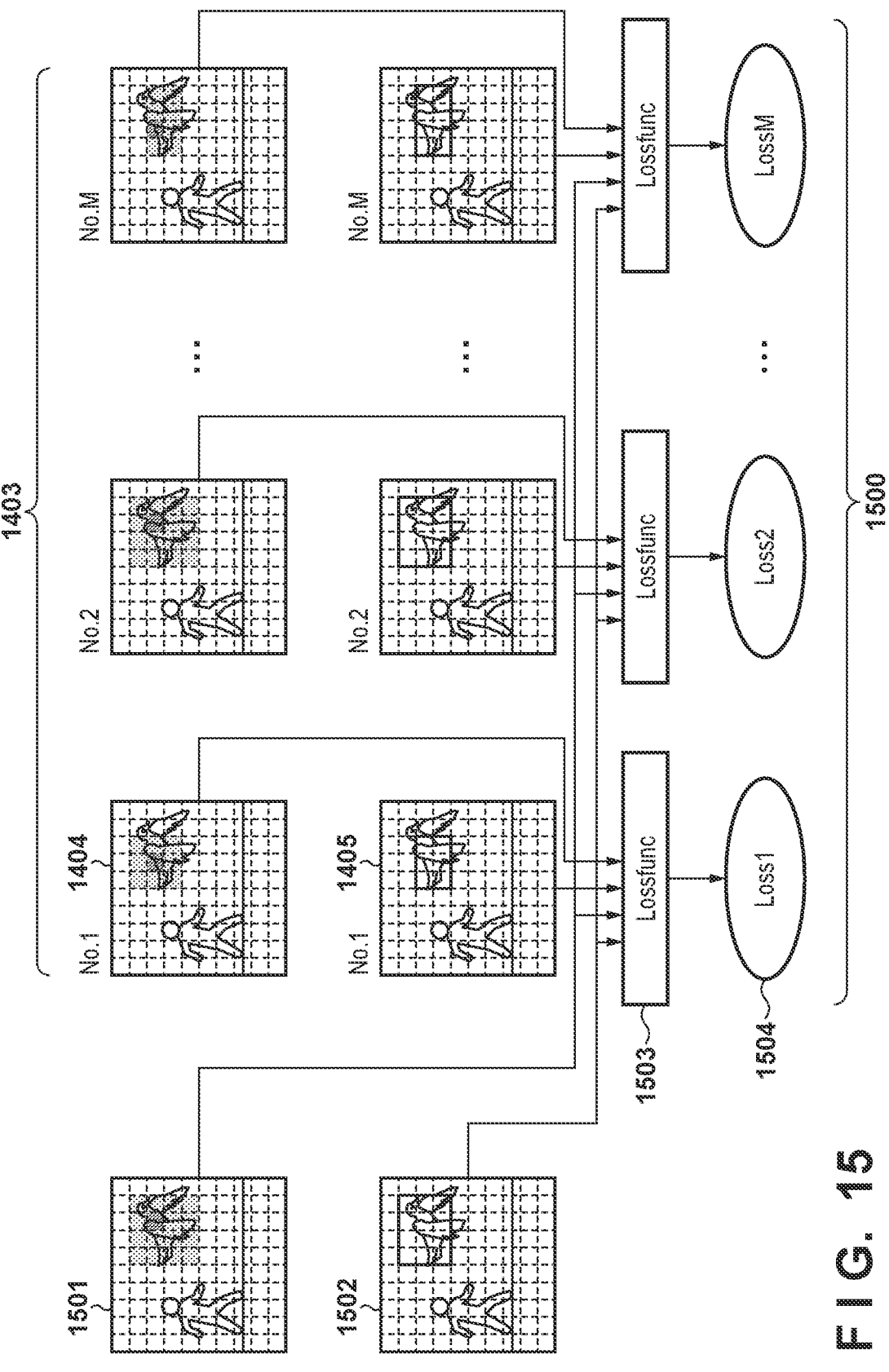
F I G. 15

F I G. 16
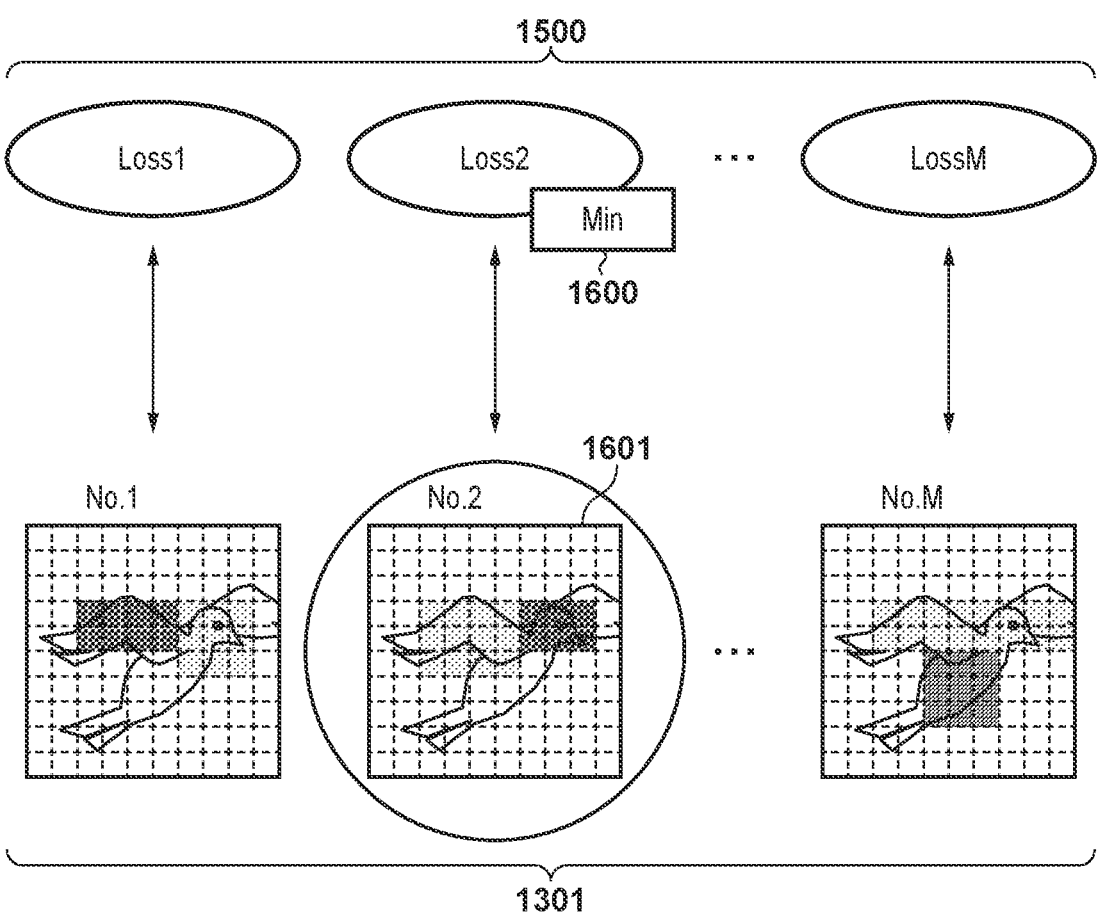

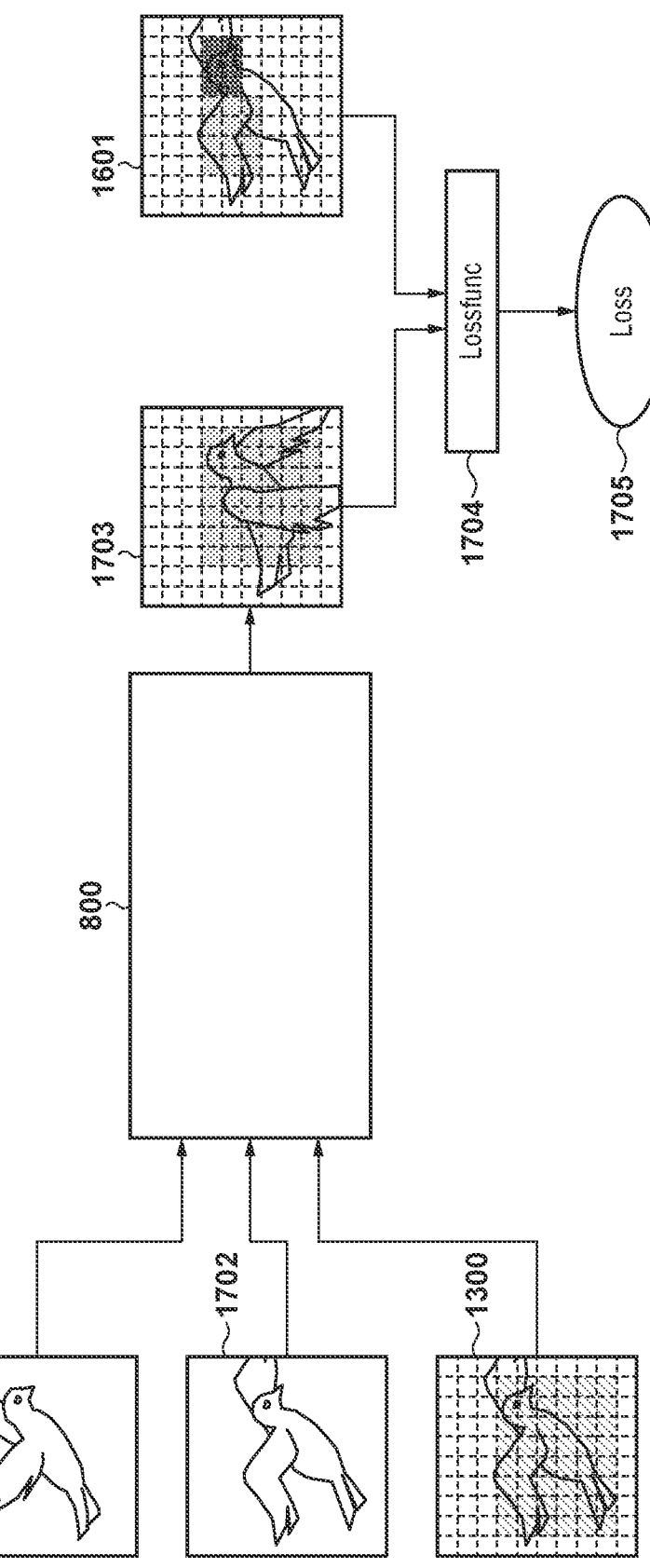
F I G. 17

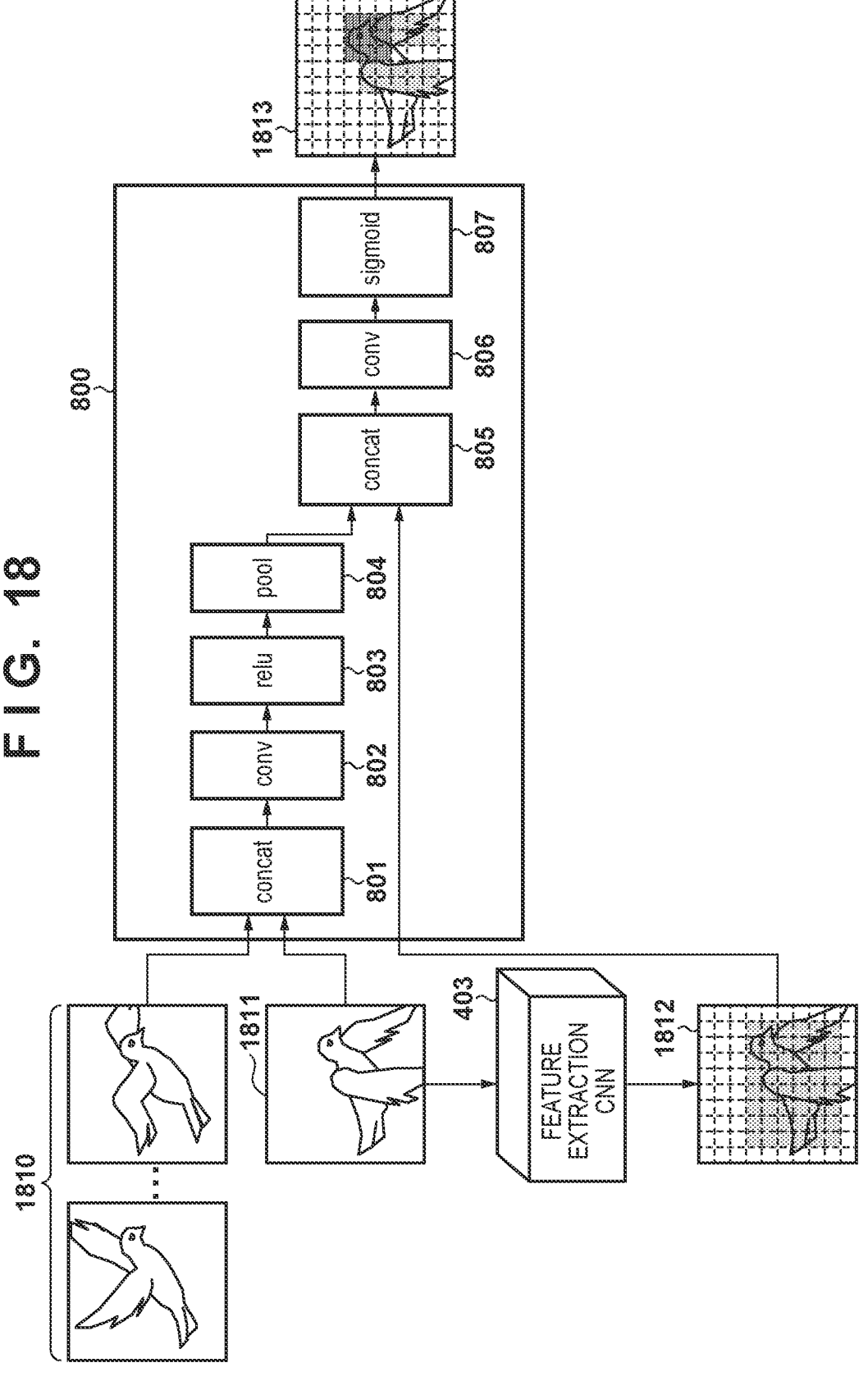
F I G. 18

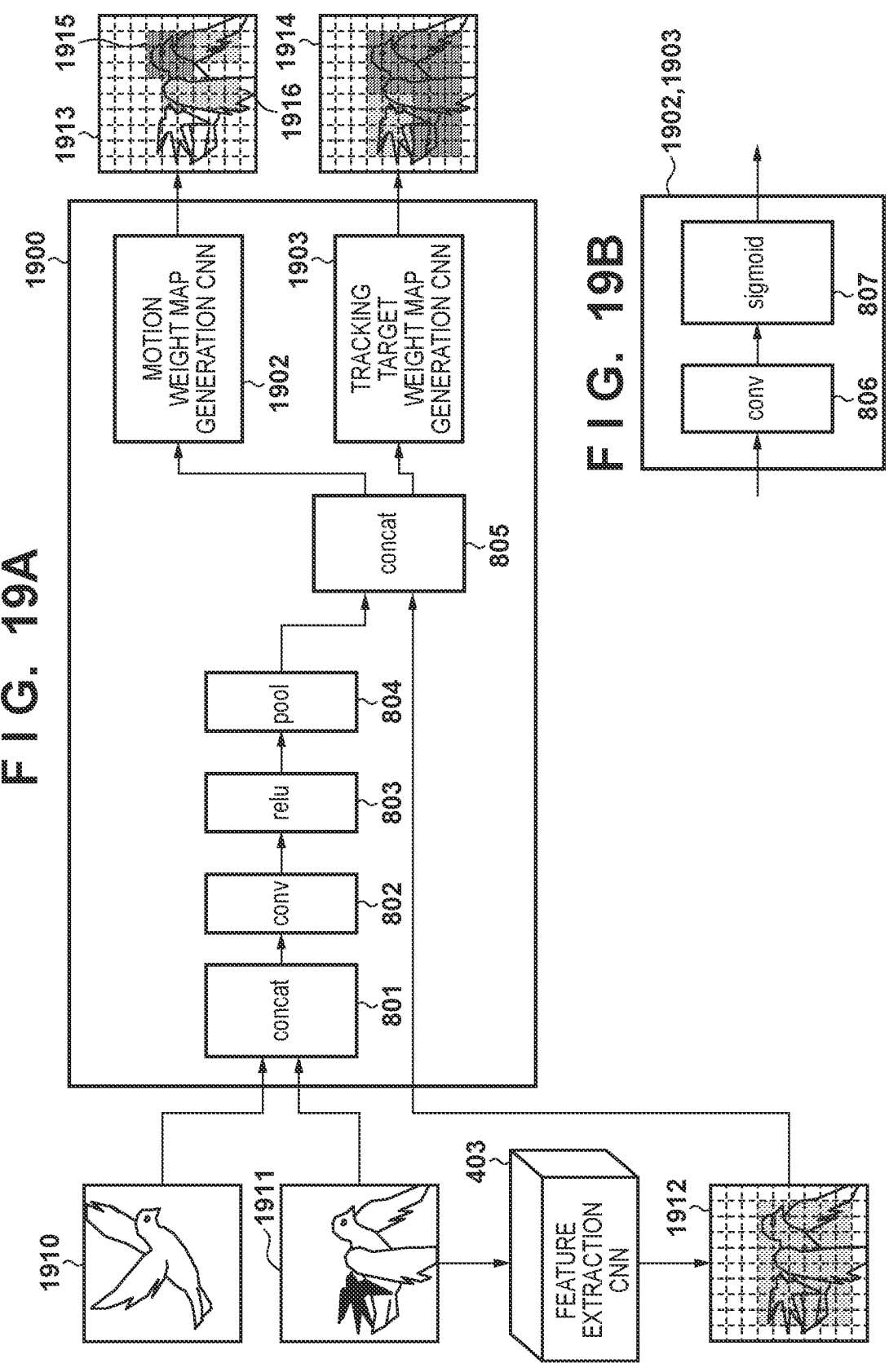
F I G. 19A
F I G. 19B

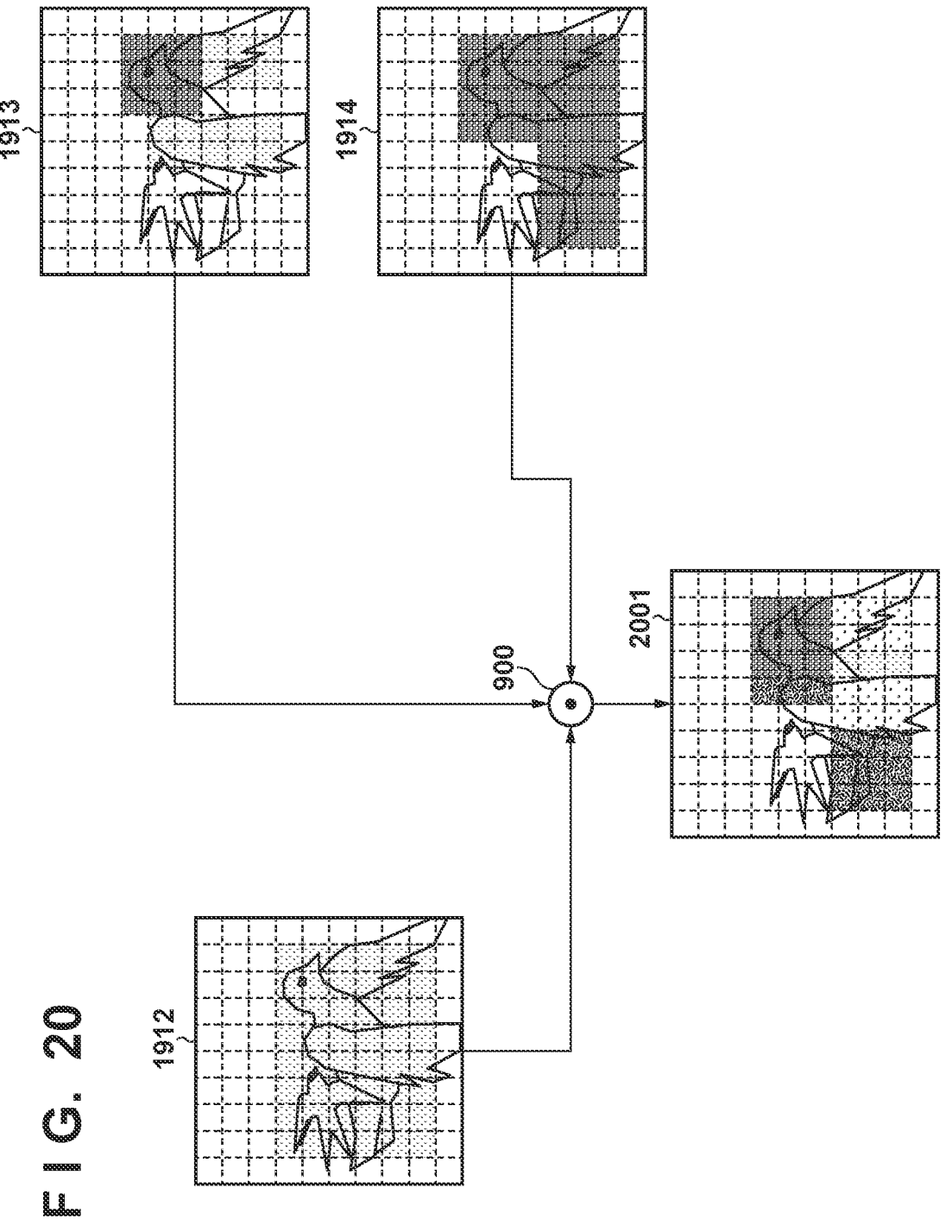

F I G. 21
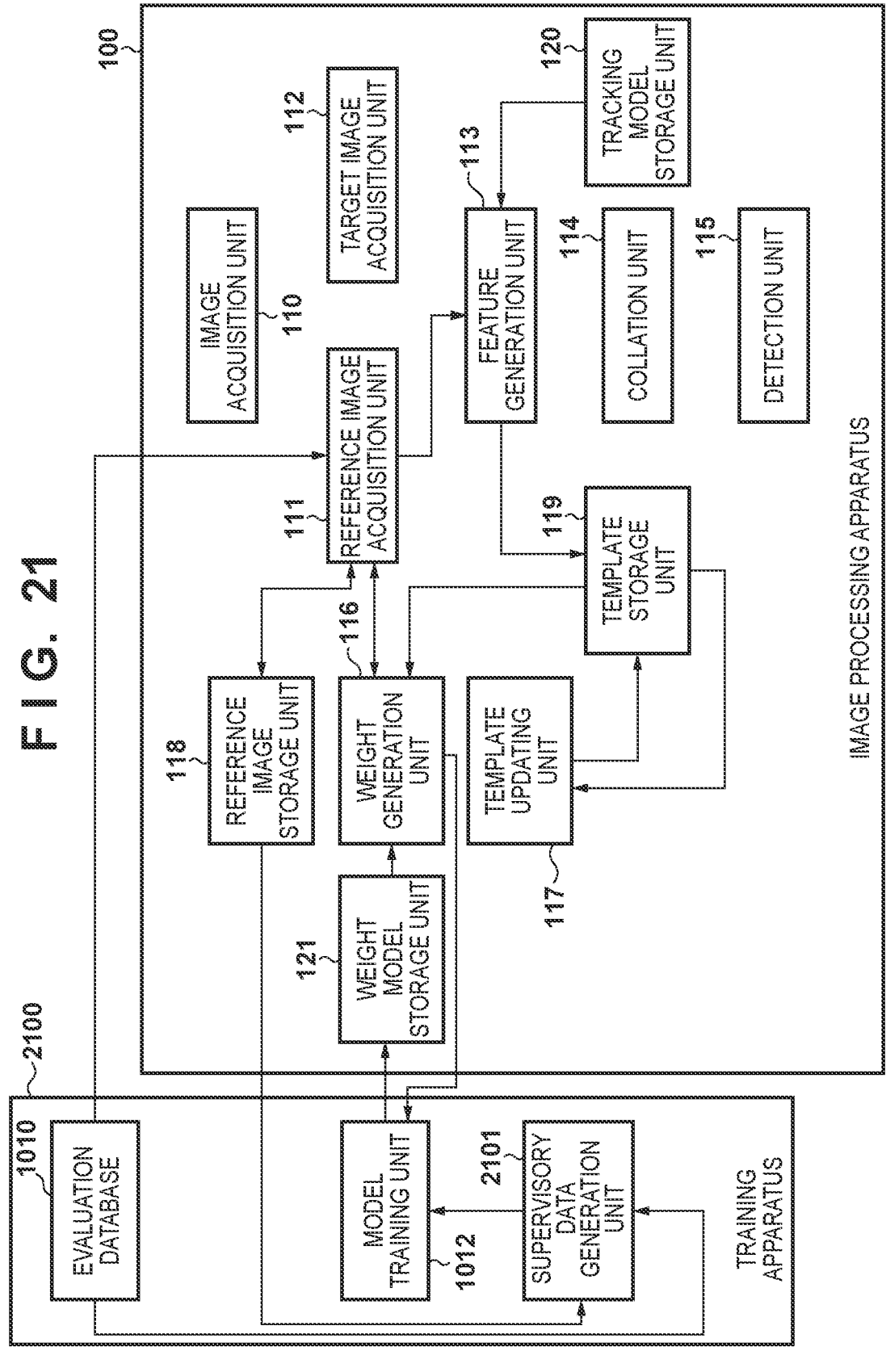

F I G. 22
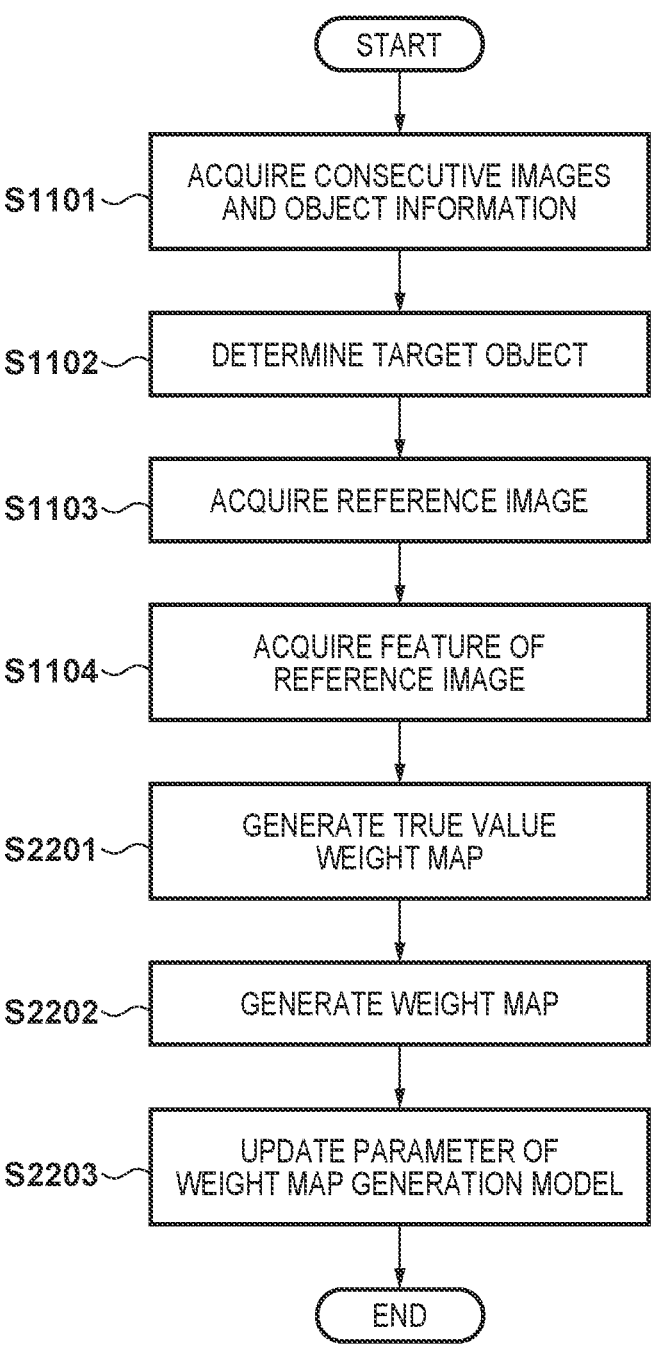
START
S1101 — ACQUIRE CONSECUTIVE IMAGES AND OBJECT INFORMATION
S1102 — DETERMINE TARGET OBJECT
S1103 — ACQUIRE REFERENCE IMAGE
S1104 — ACQUIRE FEATURE OF REFERENCE IMAGE
S2201 — GENERATE TRUE VALUE WEIGHT MAP
S2202 — GENERATE WEIGHT MAP
S2203 — UPDATE PARAMETER OF WEIGHT MAP GENERATION MODEL
END

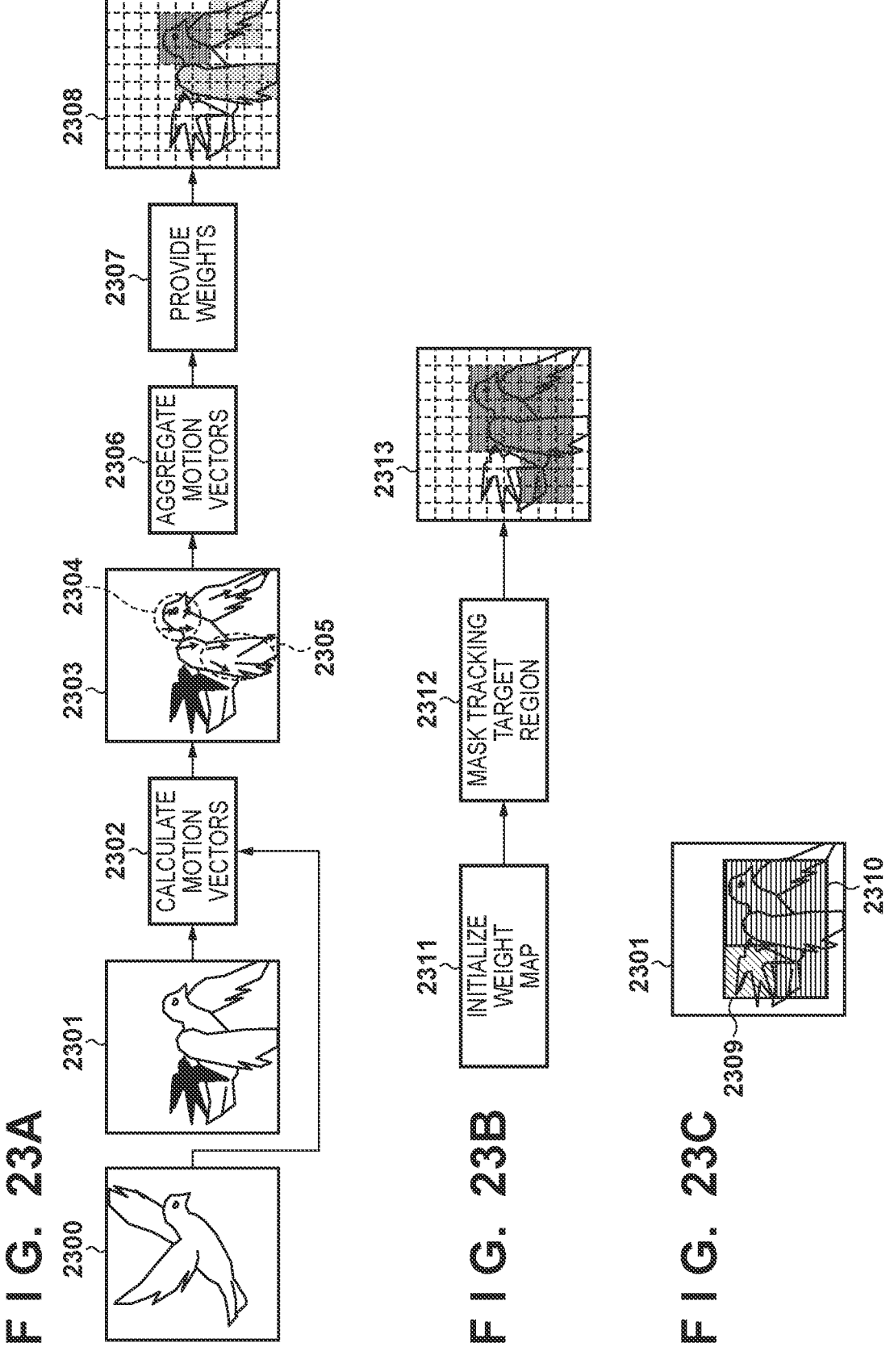
F I G. 23A
F I G. 23B
F I G. 23C

IMAGE PROCESSING APPARATUS, TRAINING APPARATUS, IMAGE PROCESSING METHOD, TRAINING METHOD, AND NON-TRANSITORY COMPUTER-READABLE MEDIUM

BACKGROUND

Field

The present disclosure relates to an image processing apparatus, a training apparatus, an image processing method, and a computer readable storage medium, in particular, to a technique for tracking a tracking target in an image.

Description of the Related Art

As a method of tracking a subject in an image, a method using luminance or color information, a method using template matching, and a method using a convolutional neural network (hereinafter, abbreviated as CNN) are known. When template matching is performed, an image of a subject is used as a template. Japanese Patent Laid-Open No. 2021-103598 discloses to change a shape of a template on the basis of a position change of a feature point in order to improve tracking accuracy in a case where a subject is deformed.

Furthermore, as a method using CNN, Li (B. Li et al. "High Performance Visual Tracking with Siamese Region Proposal Network", IEEE Conference on Computer Vision and Pattern Recognition (CVPR), 2018) proposes a method of detecting a subject using a Siamese type neural network. In this method, the subject is detected from the target image on the basis of cross-correlation between the feature of the image of the subject and the feature of the target image.

SUMMARY

According to an embodiment of the present disclosure, an image processing apparatus that searches for a tracking target from a target image comprises one or more memories storing instructions and one or more processors that execute the instructions to: acquire a feature of the target image and a feature of a first image of the tracking target at a first time; generate a weight of a feature for each of a plurality of positions of the first image of the tracking target on the basis of the first image of the tracking target and a second image of the tracking target at a second time; and detect the tracking target from the target image on the basis of a correlation between a feature of the target image and a feature of a first image of the tracking target weighted on the basis of the weight.

According to another embodiment of the present disclosure, an image processing apparatus that searches for a tracking target from a target image comprises one or more memories storing instructions and one or more processors that execute the instructions to: acquire a feature of the target image and a feature of a first image of the tracking target at a first time; generate a weight of a feature for each of a plurality of positions of a first image of the tracking target on the basis of a time-series change in an image of the tracking target; and detect the tracking target from the target image on the basis of a correlation between a feature of the target image and a feature of a first image of the tracking target weighted on the basis of the weight.

According to still another embodiment of the present disclosure, a training apparatus that trains a weight map generation model comprises one or more memories storing instructions and one or more processors that execute the instructions to: acquire a weight map of a feature of a first training image obtained by inputting a first training image of a tracking target, a second training image of the tracking target, and a feature of the first training image to the weight map generation model; evaluate an error between the weight map of the feature of the first training image and supervisory data of the weight map of the feature of the first training image; and update the weight map generation model based on an evaluation result of the error, wherein the weight map generation model is used by an image processing apparatus that searches for a tracking target from a target image, the image processing apparatus comprising one or more memories storing instructions and one or more processors that execute the instructions to: acquire a feature of the target image and a feature of a first image of the tracking target at a first time; generate a weight map indicating a weight of the feature for each of a plurality of positions of a first image of the tracking target on the basis of the first image of the tracking target and a second image of the tracking target at a second time using the weight map generation model; and detect the tracking target from the target image on the basis of a correlation between a feature of the target image and a feature of a first image of the tracking target weighted on the basis of the weight.

According to yet another embodiment of the present disclosure, an image processing method for searching for a tracking target from a target image comprises: acquiring a feature of the target image and a feature of a first image of the tracking target at a first time; generating a weight of a feature for each of a plurality of positions of the first image of the tracking target on the basis of the first image of the tracking target and a second image of the tracking target at a second time; and detecting the tracking target from the target image on the basis of a correlation between a feature of the target image and a feature of a first image of the tracking target weighted on the basis of the weight.

According to yet still another embodiment of the present disclosure, a non-transitory computer-readable medium stores a program executable by a computer to perform a method for searching for a tracking target from a target image, the method comprising: acquiring a feature of the target image and a feature of a first image of the tracking target at a first time; generating a weight of a feature for each of a plurality of positions of the first image of the tracking target on the basis of the first image of the tracking target and a second image of the tracking target at a second time; and detecting the tracking target from the target image on the basis of a correlation between a feature of the target image and a feature of a first image of the tracking target weighted on the basis of the weight.

According to still yet another embodiment of the present disclosure, a training method for training a weight map generation model comprises: acquiring a weight map of a feature of a first training image obtained by inputting a first training image of a tracking target, a second training image of the tracking target, and a feature of the first training image to the weight map generation model; evaluating an error between the weight map of the feature of the first training image and supervisory data of the weight map of the feature of the first training image; and updating the weight map generation model based on an evaluation result of the error, wherein the weight map generation model is used in an image processing method for searching for a tracking target from a target image, the image processing method comprising: acquiring a feature of the target image and a feature of a first image of the tracking target at a first time; generating a weight map indicating a weight of the feature for each of a plurality of positions of a first image of the tracking target on the basis of the first image of the tracking target and a second image of the tracking target at a second time using the weight map generation model; and detecting the tracking target from the target image on the basis of a correlation between a feature of the target image and a feature of a first image of the tracking target weighted on the basis of the weight.

According to yet still another embodiment of the present disclosure, a non-transitory computer-readable medium stores a program executable by a computer to perform a method for training a weight map generation model, the method comprising: acquiring a weight map of a feature of a first training image obtained by inputting a first training image of a tracking target, a second training image of the tracking target, and a feature of the first training image to the weight map generation model; evaluating an error between the weight map of the feature of the first training image and supervisory data of the weight map of the feature of the first training image; and updating the weight map generation model based on an evaluation result of the error, wherein the weight map generation model is used in an image processing method for searching for a tracking target from a target image, the image processing method comprising: acquiring a feature of the target image and a feature of a first image of the tracking target at a first time; generating a weight map indicating a weight of the feature for each of a plurality of positions of a first image of the tracking target on the basis of the first image of the tracking target and a second image of the tracking target at a second time using the weight map generation model; and detecting the tracking target from the target image on the basis of a correlation between a feature of the target image and a feature of a first image of the tracking target weighted on the basis of the weight.

Further features of the present disclosure will become apparent from the following description of exemplary embodiments (with reference to the attached drawings).

BRIEF DESCRIPTION OF THE DRAWINGS

FIG. 1 is illustrates a hardware configuration example of an image processing apparatus and a training apparatus.

FIGS. 3A to 3C are flowcharts of an image processing method according to one embodiment.

FIG. 4 is a diagram illustrating an example of a configuration of a neural network for tracking process.

FIG. 6 is a diagram illustrating a method for acquiring a target image.

FIGS. 7A to 7C are diagrams explaining a method for calculating a position and a size of a tracking target.

FIG. 11 is a flowchart of a training method according to one embodiment.

FIGS. 12A to 12C are diagrams illustrating data used for training.

FIG. 14 is a diagram explaining output of a likelihood map and a size map.

FIG. 15 is a diagram illustrating evaluation of a detection result using a weight map candidate.

FIG. 16 is a diagram for explaining selection of a weight map from weight map candidates.

FIG. 17 is a diagram illustrating evaluation of a weight map generation model.

FIG. 18 is a diagram illustrating an example of a configuration of a weight map generation model.

FIGS. 19A to 19B are diagrams illustrating an example of a configuration of a weight map generation model.

FIG. 20 is a diagram for explaining weighting of features.

FIG. 21 is a diagram illustrating a functional configuration example of a training apparatus according to one embodiment.

FIG. 22 is a flowchart of a training method according to one embodiment.

FIGS. 23A to 23C are diagrams illustrating a method of generating supervisory data of a weight map.

DESCRIPTION OF THE EMBODIMENTS

Figure 2:
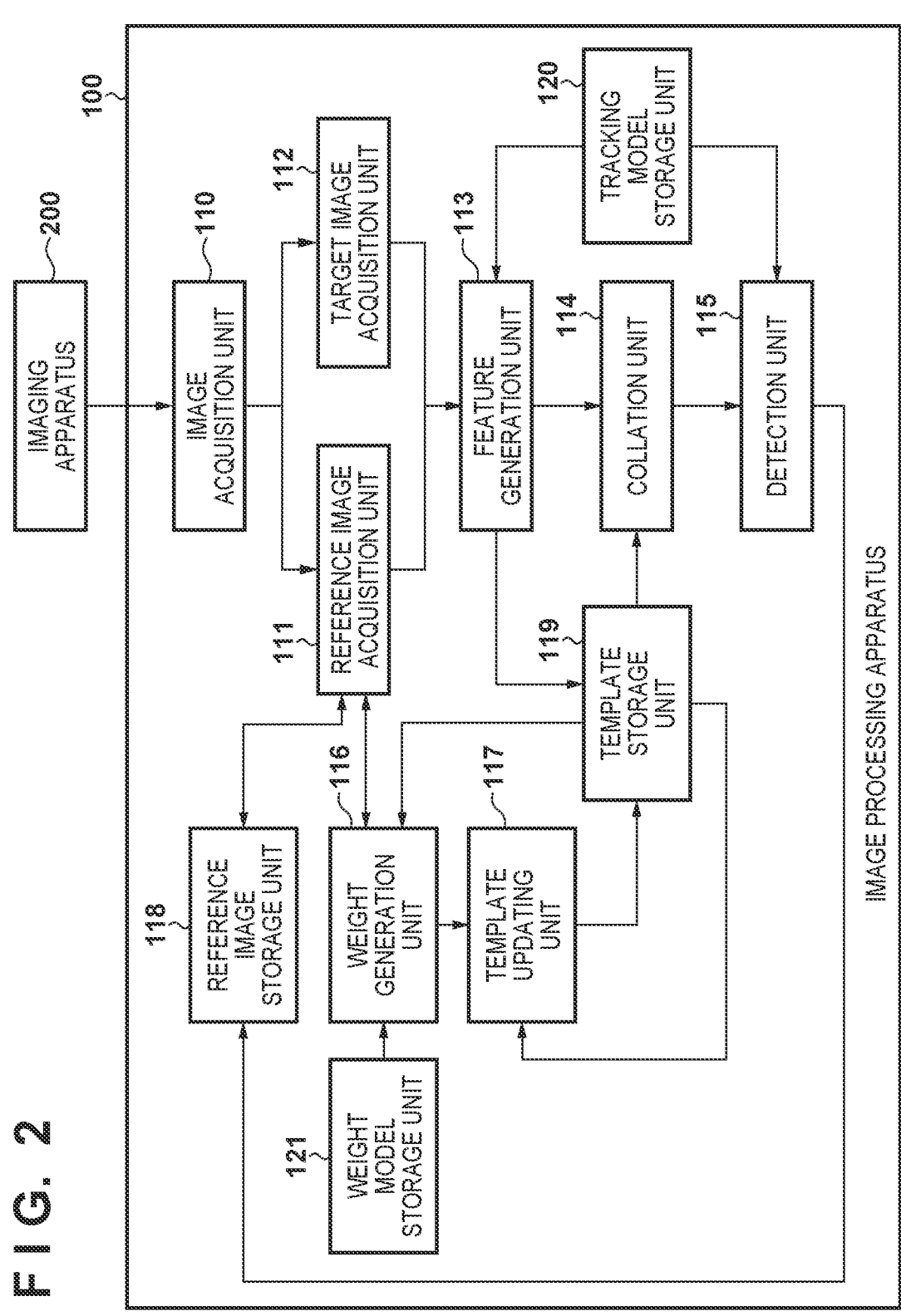
FIG. 2 is a diagram illustrating a functional configuration example of an image processing apparatus according to one embodiment.

Hereinafter, embodiments will be described in detail with reference to the attached drawings. Note, the following embodiments are not intended to limit the scope of claims. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

The method described in Li has attracted attention in recent years as a high-speed tracking method. On the other hand, even in a case where the subject is detected using the correlation of the feature like Li, it is required to improve the tracking accuracy even in a case where the image of the subject changes over time.

An embodiment of the present disclosure can improve robustness against a time-series change of a subject in tracking of the subject.

An image processing apparatus according to an embodiment of the present disclosure can search for a tracking target from a target image. The tracking target is not particularly limited. For example, the tracking target may be a specific object (e.g., a person). In addition, the tracking target can be designated by the user of the image processing apparatus. Furthermore, the image processing apparatus can search for a tracking target from each of the plurality of target images. Here, the target image may be a frame image constituting a moving image. In the following example, the user designates an object to be captured on the digital camera. Then, the designated object is set as the subject to be tracked. At this time, the image processing apparatus can continue to track the tracking target in each of the plurality of images captured by the digital camera. In such a camera system, focusing or image processing on a subject can be performed on the basis of a detection result of a tracking target.

FIG. 1 illustrates a hardware configuration example of an image processing apparatus 100 and a training apparatus 1001 according to an embodiment of the present disclosure. The image processing apparatus 100 and the training apparatus 1001 can be realized using a general-purpose information processing apparatus. For example, the image processing apparatus 100 and the training apparatus 1001 can be realized by a computer including a processor and a memory. As illustrated in FIG. 1, such a computer may include a CPU 101, a memory 102, an input unit 103, a storage unit 104, a display unit 105, a communication unit 106, and the like. A processor such as the CPU 101 executes a program stored in a memory such as the memory 102 or the storage unit 104, thereby realizing the functions of the units illustrated in FIG. 2 and the like to be described later.

The CPU 101 controls the operation of the entire computer. The memory 102 temporarily stores programs, data, and the like. The memory 102 is, for example, a RAM. The input unit 103 can acquire the input information. The input unit 103 is an input device such as a keyboard or a mouse. The storage unit 104 stores programs, data, and the like for a long period of time. The storage unit 104 is a storage medium such as a hard disk or a CD-ROM. The display unit 105 can display information. The display unit 105 is, for example, a display. The communication unit 106 can perform information communication with an external device. The communication unit 106 is, for example, a communication interface.

FIG. 2 illustrates a functional configuration example of the image processing apparatus 100 according to the present embodiment. The image processing apparatus 100 is connected to an imaging apparatus 200. The imaging apparatus 200 captures an image. Then, the imaging apparatus 200 outputs the captured image to an image acquisition unit 110. The imaging apparatus 200 can include an optical system, an imaging element, and the like. Note that the image processing apparatus 100 and the imaging apparatus 200 may be separate devices or may be integrated. For example, in one embodiment, the digital camera may have the function of the image processing apparatus 100 and the function of the imaging apparatus 200. Furthermore, at least one of the image processing apparatus according to an embodiment and a training apparatus according to an embodiment to be described later may be configured by, for example, a plurality of information processing apparatuses connected via a network.

The image processing apparatus 100 illustrated in FIG. 2 includes a feature generation unit 113, a weight generation unit 116, and a detection unit 115. The image processing apparatus 100 may also include an image acquisition unit 110, a reference image acquisition unit 111, a target image acquisition unit 112, a collation unit 114, and a template updating unit 117. The image processing apparatus 100 may further include a reference image storage unit 118, a template storage unit 119, a tracking model storage unit 120, and a weight model storage unit 121.

The image acquisition unit 110 acquires an image. The image acquisition unit 110 can acquire an image captured by the imaging apparatus 200. Furthermore, the image acquisition unit 110 can acquire time-series images. Here, the image acquisition unit 110 can acquire an image in which an object to be tracked is captured. The image acquired by the image acquisition unit 110 can be used to obtain a reference image as described later. Furthermore, the image acquired by the image acquisition unit 110 can be used to obtain a target image as described later.

The reference image acquisition unit 111 acquires a reference image. The reference image is an image in which a tracking target is captured. For example, the reference image acquisition unit 111 can generate the reference image by cutting out a region in which the object of the tracking target is captured from the image acquired by the image acquisition unit 110.

The target image acquisition unit 112 acquires a target image to be a search target of a tracking target. For example, the target image acquisition unit 112 can generate the target image by cutting out a partial region in the image acquired by the image acquisition unit 110. The target image acquisition unit 112 may determine the region from which the target image is cut out on the basis of the detection result of the tracking target at the past time. However, the entire image acquired by the image acquisition unit 110 (e.g., the image captured by the imaging apparatus 200) may be used as the target image.

The feature generation unit 113 generates a feature of an image. In particular, the feature generation unit 113 can acquire the feature of the image of the tracking target (i.e., the reference image). For example, the feature generation unit 113 can acquire the feature of the first image of the tracking target at the first time as the feature of the reference image. Here, the first image may be an image captured before the target image.

The feature generation unit 113 can generate the feature of the reference image from the reference image. Here, the reference image is generated by the reference image acquisition unit 111 or the detection unit 115. For example, the detection unit 115 can generate the first image of the tracking target from the target image captured at the first time on the basis of the detection result of the tracking target from the target image captured at the first time through a method to be described later. Note that the feature of the reference image can be used as a template feature to be described later. On the other hand, as described later, the feature of the reference image weighted based on the weight generated by the weight generation unit 116 can also be used as the template feature to be described later.

Furthermore, the feature generation unit 113 can generate a search feature that is a feature of the target image. The feature generation unit 113 can generate a search feature from the target image. Here, the feature generation unit 113 can generate a feature of an image using a neural network. In particular, the feature generation unit 113 can obtain the feature of the reference image and the feature of the target image from the reference image and the target image, respectively, using the neural network following the common parameter.

The collation unit 114 performs correlation operation between the feature of the target image and the template feature. Here, as described above, the template feature is the feature of the reference image or the feature of the reference image weighted based on the weight generated by the weight generation unit 116. The correlation operation can be performed, for example, according to the method described in Li.

The detection unit 115 detects the tracking target from the target image based on the correlation between the feature of the target image and the template feature. The detection unit 115 can detect the tracking target based on the result of the correlation operation performed by the collation unit 114. The tracking target can be detected, for example, according to the method described in Li. In addition, the detection unit 115 can generate a new reference image by cutting out the region of the tracking target from the target image based on the detection result of the tracking target. The reference image thus generated can be used to detect the tracking target from the new target image.

The weight generation unit 116 generates a weight of a feature for each of a plurality of positions of a first image of a tracking target using a plurality of time-series images of the tracking target. For example, the weight generation unit 116 can generate the weight of the feature on the basis of the first image of the tracking target and the second image of the tracking target at the second time. The first image and the second image are time-series images captured at different times. The second image may be an image captured prior to the target image. In addition, the second image may be an image captured before the first image. For example, the second image, the first image, and the target image may be captured in this order. Furthermore, the weight generation unit 116 may generate the weight of the feature based on the first image of the tracking target, the second image of the tracking target, and the feature of the first image of the tracking target.

Here, the weight generation unit 116 can generate the weight of the feature based on a time-series change of the image of the tracking target. For example, the weight generation unit 116 can set a large weight for a region in which the time-series change of the image of the tracking target is small, for example, a region in which the movement of the tracking target is small. In addition, the weight generation unit 116 can set a small weight for a region in which the time-series change of the image of the tracking target is large, for example, a region in which the movement of the tracking target is large. In this manner, the weight generation unit 116 can generate the weight of the feature such that the weight at the position where the time-series change of the image of the tracking target is small is larger than the weight at the position where the time-series change of the image of the tracking target is large. Through the use of such a weight, it becomes possible to perform tracking of the tracking target while emphasizing a portion of the tracking target in which the moving direction, the moving amount, the color, the pattern, and the like are unlikely to change. Therefore, robustness of the tracking process with respect to the time-series change of the image of the tracking target can be improved.

A method of generating the weight of the feature is not particularly limited. For example, the weight generation unit 116 can evaluate a difference (e.g., a difference in color information, a feature, or a position of a feature point) between time-series images of the tracking target for each of a plurality of positions of the images. Then, the weight generation unit 116 can determine a change in image of the tracking target for each of the plurality of positions of the image on the basis of the evaluation of such a difference. In addition, the weight generation unit 116 may generate the weight of the feature so that the weight changes depending on whether or not the tracking target is present.

On the other hand, the weight generation unit 116 can generate the weight of the feature using the weight map generation model. For example, the weight generation unit 116 can generate the weight map indicating the weight of the feature for each of the plurality of positions of the first image of the tracking target using the weight map generation model. Specifically, the weight generation unit 116 can generate the weight of the feature by inputting the first image and the second image of the tracking target to the weight map generation model. In one embodiment, the weight generation unit 116 generates the weight map by inputting the feature of the time-series image in addition to the time-series image in which the tracking target is captured. For example, the weight generation unit 116 can generate the weight of the feature of the first image for each of the plurality of positions of the first image by inputting the feature of the first image in addition to the first image and the second image of the tracking target to the weight map generation model. Details will be described later with reference to FIG. 8.

The template updating unit 117 generates a new template feature by weighting the feature of the first image of the tracking target based on the weight of the feature generated by the weight generation unit 116. The template updating unit 117 stores the generated new template feature in the template storage unit 119.

The reference image storage unit 118 stores a reference image acquired at any time in processing by the image processing apparatus 100. The template storage unit 119 stores a template feature acquired at any time in processing by the image processing apparatus 100.

The tracking model storage unit 120 stores parameters of a model trained in advance, which are used by the feature generation unit 113 to acquire a feature. The tracking model storage unit 120 also stores parameters of a model trained in advance, which are used by the detection unit 115 to detect a tracking target. The weight model storage unit 121 stores parameters of a model trained in advance, which are used by the weight generation unit 116 to generate a weight map.

An image processing method performed by the image processing apparatus 100 as described above to search for a tracking target from a target image will be described with reference to flowcharts in FIGS. 3A to 3C. In the following example, the target image is each of the time-series images obtained by the imaging apparatus 200 continuously performing imaging. That is, an object to be tracked is detected from each of the time-series images.

FIG. 3A shows processing for setting a tracking target. In the following example, a user designates a tracking target on a digital camera having the functions of the image processing apparatus 100 and the imaging apparatus 200. The user can designate an object to be photographed as a tracking target. FIG. 3B represents processing for detecting an object to be tracked from a target image. In this example, the object to be tracked designated in the processing according to FIG. 3A is detected from each of the images sequentially captured by the imaging apparatus 200. FIG. 3C represents processing for updating a template feature, which is a feature of an image of a tracking target. In this example, the template feature is updated based on the result of the tracking process according to FIG. 3B. The process of setting the tracking target in FIG. 3A may be executed only once at the start of the tracking process. Thereafter, the tracking process of FIG. 3B and the template feature updating process of FIG. 3C are sequentially and repeatedly executed.

Figure 4:
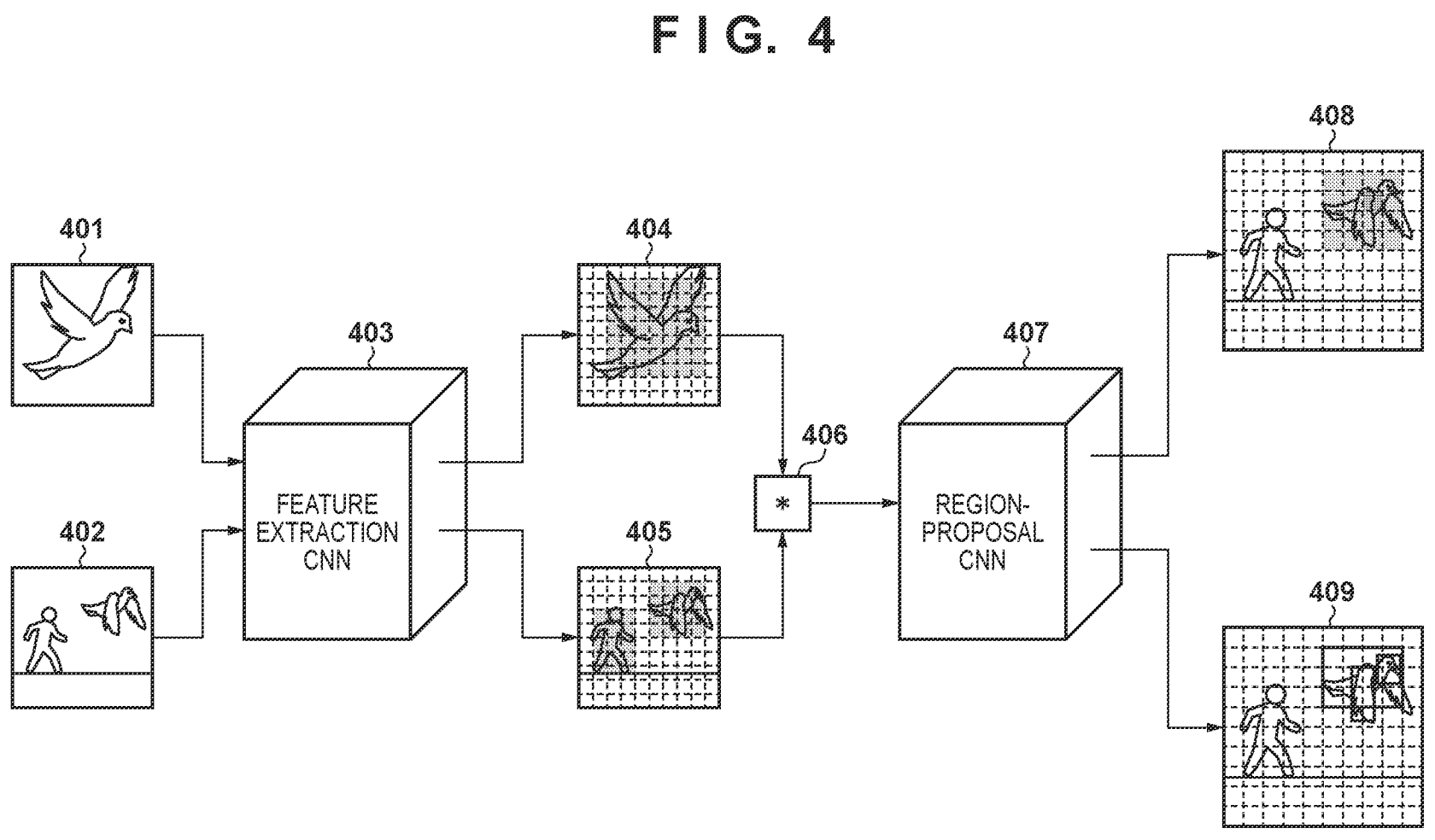

Note that the tracking process in the present embodiment is performed on the basis of a correlation between the template feature 404 based on the feature of the image of the tracking target and the search feature 405 that is the feature of the target image. As a specific example, a method of performing tracking process using a neural network described in Li will be described below. FIG. 4 illustrates a configuration example of a neural network that realizes the tracking process. The feature extraction CNN 403 and the region-proposal CNN 407 are neural networks including a plurality of convolution layers and activation layers. Parameters such as weights and biases for the feature extraction CNN 403 and the region-proposal CNN 407 are trained in advance. These parameters are stored in the tracking model storage unit 120. The feature generation unit 113 reads a parameter stored in the tracking model storage unit 120, and extracts a feature using a feature extraction CNN 403 according to the parameter. In addition, the detection unit 115 reads the parameter stored in the tracking model storage unit 120 and detects the tracking target using the region-proposal CNN 407 according to the parameter.

First, a processing flow for setting a tracking target shown in FIG. 3A will be described. In S301, the image acquisition unit 110 acquires an image in which the object to be tracked is captured, which is captured by the imaging apparatus 200.

In S302, the reference image acquisition unit 111 acquires a reference image by cutting out a region of the object to be tracked from the image acquired by the image acquisition unit 110. The reference image acquisition unit 111 stores the acquired reference image in the reference image storage unit 118.

Figure 5:
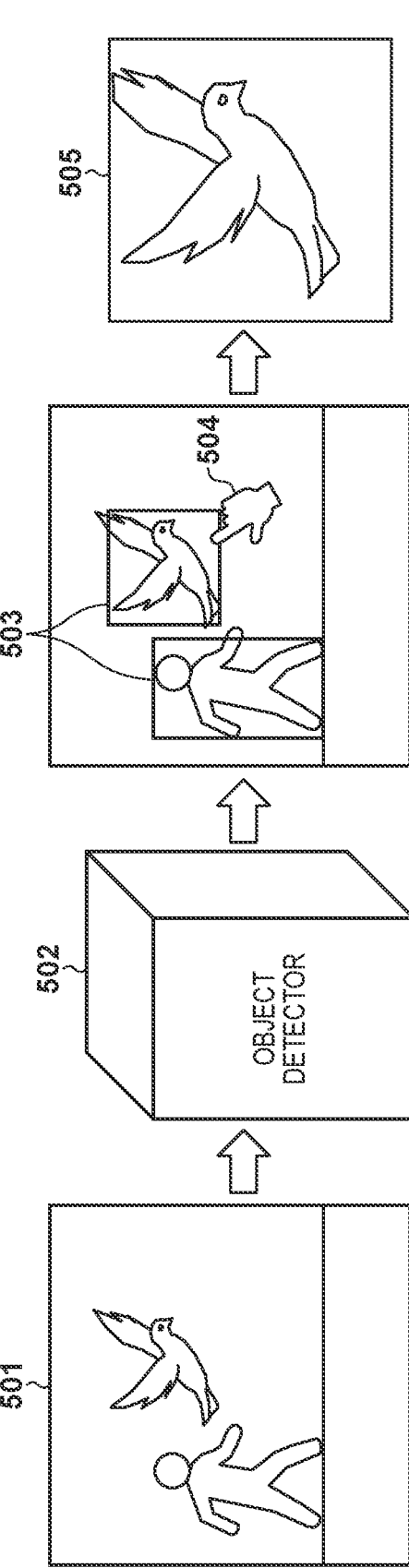
FIG. 5 is a diagram illustrating a method for acquiring a reference image.

The reference image acquisition unit 111 may acquire a user input indicating a position of an object to be tracked in an image. In this case, the reference image acquisition unit 111 can acquire a reference image according to a user input. An example of a method for obtaining a reference image will be described with reference to FIG. 5. First, the reference image acquisition unit 111 inputs the image 501 acquired from the image acquisition unit 110 to the object detector 502. The object detector 502 can output the center positions and sizes of all objects in the input image as the detection result 503. According to the center position and the size of the object, an object frame indicating a region of the object can be defined. Such an object detector can be realized, for example, using the object detection technique described in Zhou (X. Zhou et al. "Objects as Points", arXiv: 1904.07850).

Next, the reference image acquisition unit 111 receives an operation 504 for designating an object to be tracked. For example, the reference image acquisition unit 111 may display the image 501 on a display unit of a digital camera. The reference image acquisition unit 111 may further display the detection result 503 on the display unit of the digital camera. At this time, the user can perform an operation 504 of touching the object to be tracked on the display unit of the digital camera. Then, among the objects detected by the object detector 502, the reference image acquisition unit 111 can determine the object in which the center position is closest to the position designated by the user as the object designated by the user. Furthermore, the reference image acquisition unit 111 can cut out a region in the object frame corresponding to the object designated by the user from the image 501 as the reference image 505.

The method of acquiring the reference image is not limited to such a method. For example, the reference image acquisition unit 111 may cut out a region of a fixed size at a position designated by the user from the image 501 as a reference image 505. The reference image acquisition unit 111 may cut out a region designated by the user in the image 501 as the reference image 505.

In S303, the feature generation unit 113 acquires a template feature from the reference image obtained in S302 using the feature extraction CNN. As shown in FIG. 4, the feature generation unit 113 can generate the template feature 404 by inputting the reference image 401 obtained from the reference image acquisition unit 111 to the feature extraction CNN 403. The feature generation unit 113 stores the acquired template feature in the template storage unit 119. The template feature is used in the tracking process shown in FIG. 3B.

Next, a processing flow for the tracking process shown in FIG. 3B will be described. In S304, the image acquisition unit 110 acquires an image captured by the imaging apparatus 200. In the processing of FIG. 3B, the tracking target is detected from the image acquired in S304. That is, the object to be tracked may be captured in the image acquired in the S304.

In S305, the target image acquisition unit 112 acquires a target image from the image acquired by the image acquisition unit 110. The image acquisition unit 110 can cut out the target image from the image acquired by the image acquisition unit 110 on the basis of, for example, the region from which the reference image is cut out in S302 or the result of the previous tracking process.

An example of a method of acquiring a target image will be described with reference to FIG. 6. In FIG. 6, a tracking target 602 is captured in an image 601 at the current time. Here, the target image acquisition unit 112 can determine the region 604 from which the target image is cut out on the basis of the position of the tracking target at a time different from the capturing time of the image 601. For example, the target image acquisition unit 112 can make the determination on the basis of the result of the tracking process at the time before the tracking target or the detection result of the tracking target in S302. In a case where the process using the image at the previous time is the process of determining the reference image by the user designating the tracking target, the target image acquisition unit 112 can determine the region of the target image on the basis of the detection result. Furthermore, in a case where the process using the image at the previous time is the tracking process, the target image acquisition unit 112 can determine the region of the target image on the basis of the detection result of the tracking target in the tracking process.

In FIG. 6, a region 603 is a region indicated by a result of such tracking process or a detection result. The target image acquisition unit 112 can determine the region 604 of the target image for the current time by enlarging the region 603. In the example of FIG. 6, the center position of the region 604 is the same as the center position of the tracking target indicated by the region 603. The size of the region 604 is determined by enlarging the size of the tracking target indicated by the region 603 at a predetermined ratio.

In S306, the feature generation unit 113 acquires the search feature from the target image obtained in S305 using the feature extraction CNN. As illustrated in FIG. 4, the feature generation unit 113 can generate the search feature 405 by inputting the target image 402 acquired from the reference image acquisition unit 111 to the feature extraction CNN 403. The feature generation unit 113 outputs the acquired feature to the collation unit 114.

In S307, the collation unit 114 acquires the template feature stored in the template storage unit 119. The template feature is the feature of the reference image acquired by the feature generation unit 113 in S303 immediately after the user designates the tracking target. After the tracking process is performed, the template feature is obtained by weighting the feature of the reference image acquired by the feature generation unit 113 in S312 by the template updating unit 117 in S314. In this manner, the template feature can be a weighted feature of the first image (reference image) of the tracking target at a first time.

In S308, the collation unit 114 performs correlation operation between the template feature acquired in S307 and the search feature acquired in S306. In the example illustrated in FIG. 4, the collation unit 114 acquires a correlation feature by performing a correlation operation 406 between the template feature 404 and the search feature 405. Then, the collation unit 114 outputs the acquired correlation feature to the detection unit 115.

In S309, the detection unit 115 detects the tracking target from the target image. First, the detection unit 115 acquires information on a tracking target using the region-proposal CNN. When the correlation feature obtained by the correlation operation between the template feature and the search feature is input, the region-proposal CNN outputs information of the tracking target on the target image. In addition, the detection unit 115 can output an object frame indicating a region of the tracking target in the target image as a detection result of the tracking target.

Furthermore, the detection unit 115 generates a new reference image indicating the tracking target from the target image based on the detection result of the tracking target. For example, the detection unit 115 can cut out an image in the object frame obtained as a detection result of the tracking target in the target image as the reference image. The detection unit 115 can store the generated reference image in the reference image storage unit 118 to be used in the next tracking process.

The description will be made with reference to FIG. 4, where the detection unit 115 acquires information on the tracking target on the target image by inputting the correlation feature acquired in S308 to the region-proposal CNN 407. In the present embodiment, the region-proposal CNN 407 can output, as the information on the tracking target, a likelihood map 408 representing the likelihood that the tracking target is present on the target image and a size map 409 representing the size of the tracking target on the target image. Next, the detection unit 115 calculates the position and size of the tracking target on the target image from the acquired likelihood map 408 and size map 409, and outputs the calculation result as the detection result of the tracking target.

Furthermore, a method in which the detection unit 115 calculates the position and the size of the tracking target will be described with reference to FIGS. 7A to 7C. First, the detection unit 115 detects a peak position 701 of the likelihood on the likelihood map 408. The detection unit 115 determines that the peak position 701 indicates the position of the tracking target. The detection unit 115 may determine whether or not the tracking target is present on the target image based on the likelihood indicated by the likelihood map 408. For example, when the likelihood at the peak position 701 is lower than a threshold value, the detection unit 115 can determine that the object to be tracked is not present on the image. In addition, the detection unit 115 acquires the value of the size map 409 at the peak position 701. The detection unit 115 can determine that the acquired value indicates the size of the tracking target. The detection unit 115 can output the object frame 702 indicating the result of the tracking process based on the position and the size of the tracking target obtained in this manner.

According to the process illustrated in FIG. 3B, the tracking target is searched for from the target image based on the feature of the first image (reference image) of the tracking target at the first time before the capturing time of the target image. When the processing illustrated in FIG. 3B is finished in this manner, the template feature is updated based on the result of the tracking process. The template feature obtained by the following process is used to search for a tracking target from a target image at a later time. A processing flow for updating the template feature shown in FIG. 3C will be described below.

In S310, the reference image acquisition unit 111 acquires an image of the tracking target at a time before the target image. Here, the reference image acquisition unit 111 can acquire a reference image at a time before the target image.

The reference image is an image used to generate the template feature acquired in S307. This reference image is also a reference image acquired in S302 or S309 in the past. The reference image acquisition unit 111 can acquire such a reference image from the reference image storage unit 118. The acquired reference image is output to the weight generation unit 116. In this example, in S310, a reference image cut out from an image captured at time t–1 is acquired.

In S311, the reference image acquisition unit 111 acquires the reference image acquired at the current time from the reference image storage unit 118. This reference image is a reference image cut out from the target image by the detection unit 115 based on the result of the tracking process to be used for the next tracking process in the S309. The acquired reference image is output to the feature generation unit 113 and the weight generation unit 116. In this example, in S310, a reference image cut out from an image captured at time t is acquired.

In S312, the feature generation unit 113 acquires the feature of the reference image acquired in S311. The feature generation unit 113 can generate a feature by inputting the reference image acquired in S311 to the feature extraction CNN. The feature generation unit 113 temporarily stores the feature generated here in the template storage unit 119.

In S313, the weight generation unit 116 generates a weight map using a trained weight map generation model. The parameters of the weight map model generation model are stored in the weight model storage unit 121. The weight generation unit 116 reads a parameter stored in the weight model storage unit 121 and generates a weight map using a weight map generation model according to the parameter. When two time-series images (reference images) in which a tracking target is captured at time t–1 and time t and a feature of the reference image at time t are input, the weight map generation model outputs a weight map representing a weight with respect to the feature of the image at time t. In this example, the weight generation unit 116 inputs the reference image at time t–1 acquired in S310, the reference image at time t acquired in S311, and the feature of the reference image at time t acquired in S312 to the weight map generation model. The weight generation unit 116 outputs the weight map output as a result from the weight map generation model to the template updating unit 117.

Figure 8:
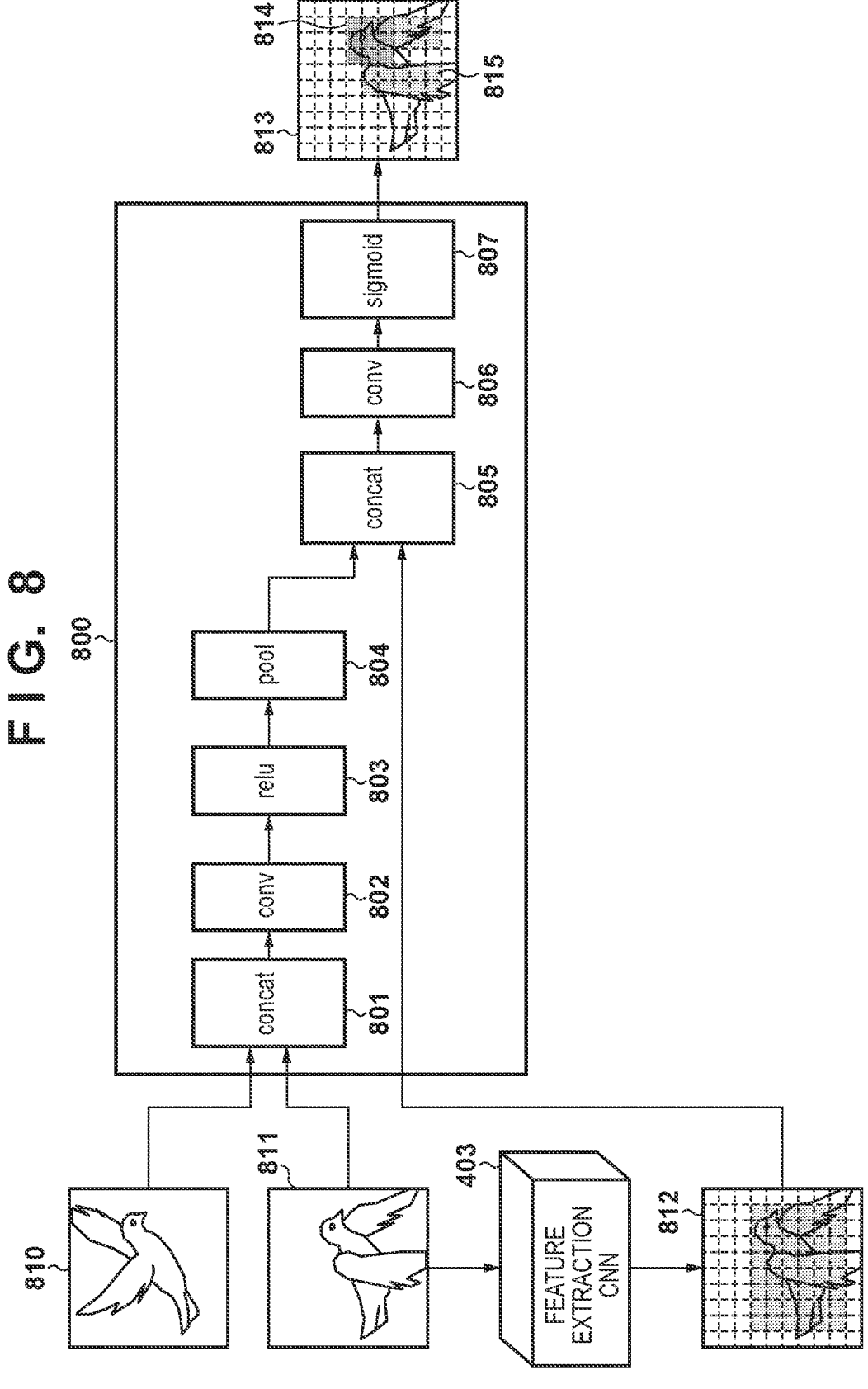
FIG. 8 is a diagram illustrating an example of a configuration of a weight map generation model.

Such a weight map generation model can be realized by using a machine training method such as, for example, a neural network or SVM. For example, the weight generation unit 116 can generate the weights of the features using the neural network. At this time, the weight map generation model may be trained to generate the weight map using a convolutional neural network. As an example, a weight map generation model realized by the neural network shown in FIG. 8 will be described. The weight map generation model can be realized by a multilayer convolutional neural network (CNN). In FIG. 8, the weight map generation model is indicated as a weight map generation CNN 800.

The two time-series images in which the tracking target is captured are a reference image 811 at time t and a reference image 810 at time t–1. The feature of the reference image at time t obtained by inputting the image at the latest time among the time-series images, that is, the reference image 811 at time t to the feature extraction CNN 403 described with reference to FIG. 4 is the feature 812. When the two reference images 810, 811 and the feature 812 are input to the weight map generation CNN 800, a weight map 813 used for weighting the feature 812 is output.

First, the weight map generation CNN 800 combines the reference images 810, 811 in the channel direction by combining process 801. The reference images 810, 811 may be generated so as to have the same size. Furthermore, at least one of the reference images 810, 811 may be resized to have the same size prior to coupling. Then, an intermediate feature is obtained by performing a convolution operation in the convolution layer 802 and an operation using the activation function 803 (Relu) on the combined image. An intermediate feature having the same spatial size as the feature 812 is obtained by a pooling process 804 on the obtained intermediate feature. The intermediate feature thus obtained and the feature 812 are combined in the channel direction by the combining process 805. A weight map 813 for the feature 812 is output as a result by performing a convolution operation in the convolution layer 806 and an operation using the activation function 807 (Sigmoid) on the combined feature.

The weight map 813 indicates a weight on the feature 812 for each of the plurality of positions in consideration of a time-series change of the object captured in the reference images 810, 811. In the example of FIG. 8, a bird is captured as a tracking target in the reference images 810, 811. The weight map 813 indicates a large weight for a characteristic face region 814 with little motion. On the other hand, a small weight is indicated for a region 815 of the wing with large motion and in which the color changes between the front and back. A training method of the weight map generation model will be described later.

In S314, the template updating unit 117 acquires the feature of the reference image at time t generated in S312 from the template storage unit 119. Then, the template updating unit 117 generates the template feature by weighting the feature of the reference image at time t based on the weight map generated in S313. For example, the template updating unit 117 can generate the template feature by multiplying the feature of the reference image at time t by the weight map generated in S313.

Figure 9:
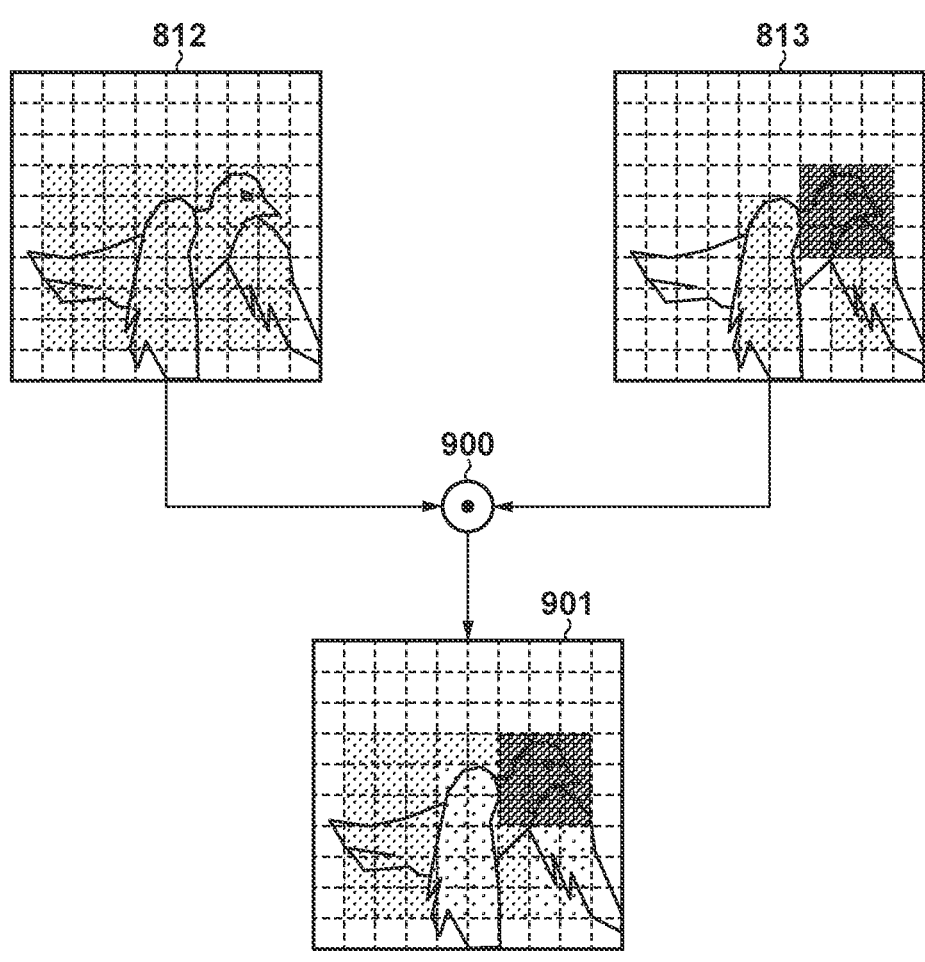
FIG. 9 is a diagram for explaining weighting of features.

With reference to FIG. 9, weighting of the feature using the weight map will be described. The feature 812 of the reference image at time t obtained using the feature extraction CNN 403 and the weight map 813 generated by the weight generation unit 116 are multiplied with an element product 900. As a result, a weighted feature 901 is obtained.

In S315, the template updating unit 117 stores the new template feature obtained by the process of S314 in the template storage unit 119. However, it is not necessary to overwrite the template feature stored in the template storage unit 119 with the new template feature obtained by the process of S314. For example, the template features stored in the template storage unit 119 may be updated through other methods such as blending of the template features.

When the process illustrated in FIG. 3C is finished, the tracking process shown in FIG. 3B is performed using the new template feature stored in the template storage unit 119 in S315. In this way, the tracking process shown in FIG. 3B and the process of updating the template feature shown in FIG. 3C can be sequentially and repeatedly executed.

According to the embodiment described above, the weight generation unit 116 generates the weight of the feature based on the time-series images of the tracking target. Furthermore, the template updating unit 117 generates a template feature by weighting the feature of the reference image based on the weight. Then, the collation unit 114 and the detection unit 115 detect the tracking target using the template feature. According to such a method, it becomes possible to detect the tracking target by placing importance on a portion where the time-series change in the image of the tracking target is small. Therefore, robustness of the tracking process with respect to the time-series change of the image of the tracking target can be improved. According to the method of the present embodiment, the accuracy of the tracking process can be improved even when the color, pattern, or the like of the tracking target changes over time.

(Training Method of Weight Map Generation Model)

Next, a method of training the weight map generation model used by the weight generation unit 116 will be described. The data format of the weights of the features generated by the weight generation unit 116 is not limited to the weight map. In a case where the weight generation unit 116 generates a weight in another form as well, training of a model that outputs such a weight can be performed by a similar method.

Figure 10:
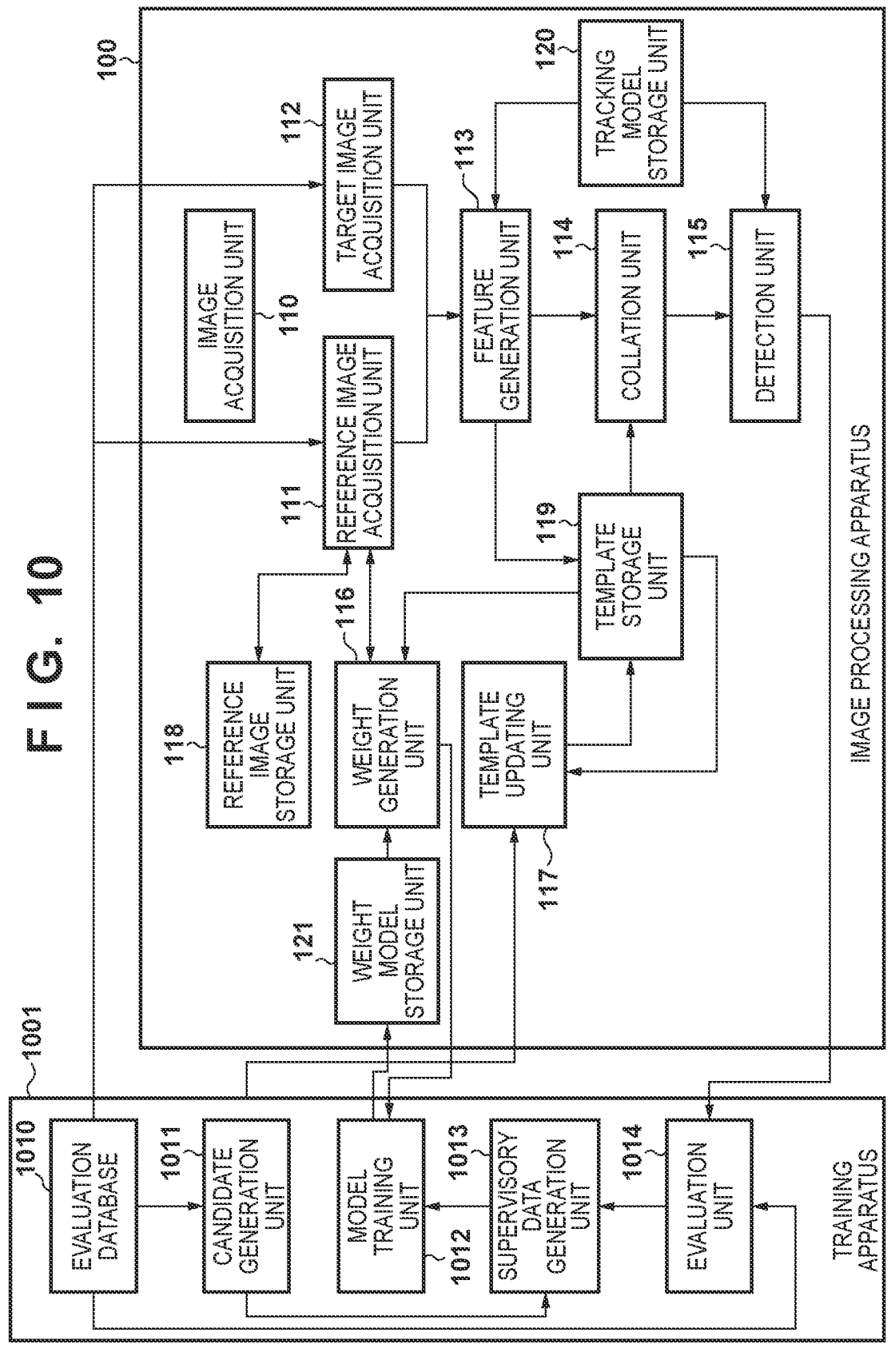
FIG. 10 is a diagram illustrating a functional configuration example of a training apparatus according to one embodiment.

The training of the weight map generation model can be performed by, for example, a training apparatus illustrated in FIG. 10. FIG. 10 illustrates a functional configuration example of such a training apparatus. The training apparatus 1001 trains the weight map generation model in cooperation with the image processing apparatus 100. The training apparatus 1001 includes an evaluation database 1010, a candidate generation unit 1011, a model training unit 1012, a supervisory data generation unit 1013, and an evaluation unit 1014. The evaluation database 1010 stores a plurality of images. In addition, the evaluation database 1010 stores information (object information) of an object captured in each image. For example, the object information may include the position of the object, its size, and an identification number that uniquely identifies the object. The evaluation database 1010 may store information on a large number of moving images and objects captured in the moving images.

The candidate generation unit 1011 generates a plurality of candidates for the weight map of the feature. This candidate is a candidate for the weight map of the feature of the first training image. The candidate generation unit 1011 can generate, for example, a plurality of weight map candidates. The candidate of the weight map is used as a candidate of supervisory data (i.e., GT) in training. A method of generating the candidates for the weight map by the candidate generation unit 1011 is not particularly limited. For example, the candidate generation unit 1011 may randomly generate a plurality of weight map candidates. In addition, the candidate generation unit 1011 may generate the candidate for the weight map by referring to the time-series images. For example, the candidate generation unit 1011 can generate a candidate for the weight map based on the first training image and the second training image. A specific candidate generation method will be described later.

The model training unit 1012 acquires the weight map of the feature of the first training image obtained by inputting the first training image of the tracking target, the second training image of the tracking target, and the feature of the first training image to the weight map generation model. The model training unit 1012 can acquire the weight map of the feature of the first training image generated by the weight generation unit 116 using the weight map generation model. The model training unit 1012 further evaluates an error between the weight map of the feature of the first training image and the supervisory data for the weight map of the feature of the first training image. The model training unit 1012 can acquire the supervisory data from the supervisory data generation unit 1013. Then, the model training unit 1012 updates the weight map generation model based on the result of the evaluation. In this way, the model training unit 1012 can train the inference parameter used by the weight map generation model so that the weight map generation model outputs the true value of the weight map indicated by the supervisory data.

The supervisory data generation unit 1013 selects the weight map of the feature from among the weight maps of the plurality of features generated by the candidate generation unit 1011 on the basis of the evaluation result of the detection result of the tracking target by the evaluation unit 1014. Then, the supervisory data generation unit 1013 generates supervisory data used for training by the model training unit 1012 on the basis of the selected feature weight map. In this way, the supervisory data generation unit 1013 can generate the true value (i.e., GT) of the weight map used for training.

The evaluation unit 1014 evaluates the detection result of the tracking target from the training target image by the image processing apparatus 100. In the present embodiment, the image processing apparatus 100 detects a tracking target from the training target image. This detection of the tracking target is performed on the basis of a correlation between the feature of the training target image and the feature of the first training image of the tracking target weighted based on the weight map of the feature for each of the plurality of positions of the first training image of the tracking target.

In the present embodiment, the image processing apparatus 100 detects a tracking target from a training target image using each of a plurality of feature weight maps (i.e., weight map candidates) generated by the candidate generation unit 1011. Then, the evaluation unit 1014 evaluates the detection result of the tracking target performed using each of the weight maps of the plurality of features.

A training method of the weight map generation model performed by the training apparatus 1001 as described above will be described with reference to a processing flow of FIG. 11.

In S1101, the evaluation database 1010 acquires three images at different times and object information for each image. For example, the evaluation database 1010 can acquire images for three consecutive frames from a moving image and object information for each image. Here, the evaluation database 1010 can acquire images of three frames in which the same object is captured. The images of the three frames include an image at time t+1, which is the newest image, an image at time t, which is an image at time before the newest image, and an image at time t−1, which is the oldest image. Note that time t may be different from time t in the description of the processing illustrated in FIGS. 3A to 3C.

The data acquired by the evaluation database 1010 will be described with reference to FIGS. 12A to 12C. FIGS. 12A to 12C show images of three consecutive frames acquired by the evaluation database 1010. The images of three frames include an image 1200 at time t−1, an image 1201 at time t, and an image 1202 at time t+1. The evaluation database 1010 also stores identification numbers of objects captured in the images 1200 to 1202. It is possible to specify that the same object is captured in each of the images 1200 to 1202 using the identification number. In the example of FIGS. 12A to 12C, since the object 1210 is captured in each of the images 1200 to 1202 of three frames, the evaluation database 1010 acquires the images 1200 to 1202 in time series.

The image 1202 at time t+1 thus acquired is used to obtain a training target image to be used in the tracking process to be performed later. Furthermore, the image 1201 at time t is used to obtain a reference image to be used in the tracking process to be performed later. The image 1201 at time t is also used for training of the weight map generation model. The image 1200 at time t−1 is used for training of the weight map generation model. The evaluation database 1010 outputs the image 1200 at time t−1 and the image 1201 at time t among the acquired images for three frames to the reference image acquisition unit 111. Furthermore, the evaluation database 1010 outputs the image 1202 at time t+1 to the target image acquisition unit 112.

In S1102, the evaluation database 1010 determines the object of the tracking target on the basis of the object information on the three images acquired in S1101. The evaluation database 1010 determines an object having the same identification number captured in all three images as a tracking target. In the example of FIGS. 12A to 12C, the object 1210 captured in all of the images for three frames is determined as the tracking target. Furthermore, the evaluation database 1010 outputs the object information on the determined tracking target to the reference image acquisition unit 111, the target image acquisition unit 112, and the evaluation unit 1014.

In S1103, the reference image acquisition unit 111 acquires the reference image including the tracking target determined in S1102 from each of the image at time t and the image at time t−1. The reference image acquisition unit 111 can cut out a region including the tracking target from the image with reference to the position and size of the object indicated by the object information. Thus, the reference image acquisition unit 111 can obtain the reference image at time t cut out from the image at time t and the reference image at time t−1 cut out from the image at time t−1. The reference image acquisition unit 111 outputs the reference image at time t to the feature generation unit 113. In addition, the reference image acquisition unit 111 stores the reference image at time t and the reference image at time t−1 in the reference image storage unit 118.

In S1104, the feature generation unit 113 acquires the feature of the reference image at time t from the reference image at time t acquired in S1103. This process can be carried out in the same manner as in S312. The feature generation unit 113 stores the obtained feature of the reference image at time t in the template storage unit 119.

In S1105, the candidate generation unit 1011 generates a plurality of candidates for the weight map of the feature. In this example, the candidate generation unit 1011 generates a predetermined number (hereinafter, M) of weight map candidates. The weight map candidate to be generated may be a one-channel map having the same spatial size (i.e., height and width) as the feature of the reference image at time t generated by the feature generation unit 113. The weight map may have random values. For example, as a method of generating the weight map, there is a method of giving a random value between 0 and 1 to each element of the map.

As another method, the candidate generation unit 1011 may generate a weight map candidate based on the reference image at time t and the reference image at time t−1. For example, the candidate generation unit 1011 can resize the two reference images to have the same height and width as the feature of the reference image at time t. In addition, the candidate generation unit 1011 can calculate the absolute value of the difference in luminance value between the two reference images after resizing. Then, the candidate generation unit 1011 can generate the candidate of the weight map such that the weight of the portion where the absolute value of the difference between the luminance values is small becomes large and the weight of the portion where the difference between the luminance values is small becomes small. A large number of weight map candidates can be generated by combining the methods described above. The candidate generation unit 1011 outputs the generated weight map candidates to the template updating unit 117 and the supervisory data generation unit 1013.

In S1106, the template updating unit 117 generates a template feature by weighting the feature of the reference image at time t stored in the template storage unit 119 using the candidate of the weight map generated in S1105. The template updating unit 117 can generate a plurality of template features by using each of a plurality of candidates of the weight map.

Figure 13:
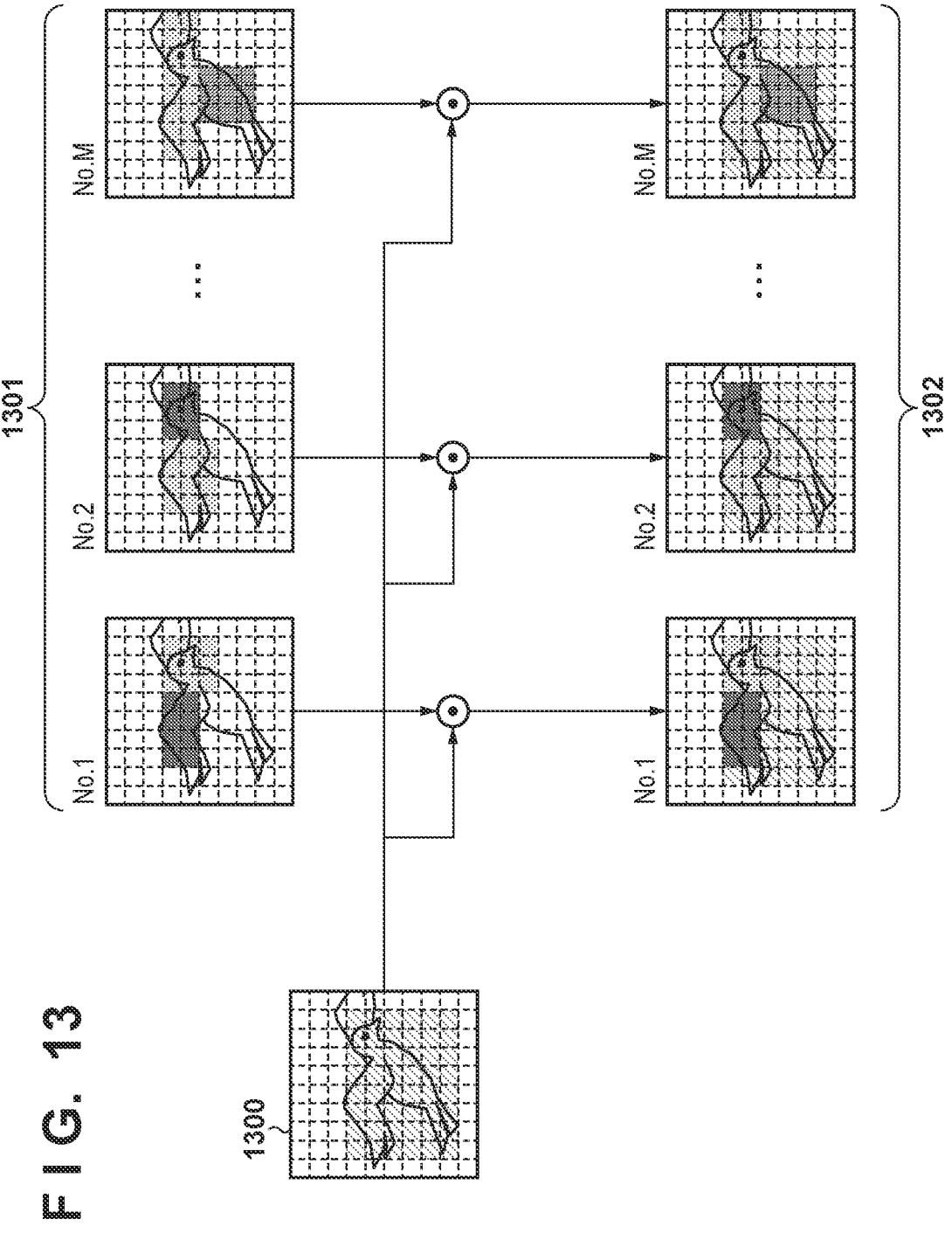
FIG. 13 is a diagram describing weight map candidates and weighting using the weight map candidates.

The process in S1106 will be described with reference to FIG. 13. The feature 1300 of the reference image at time t and each of the M weight map candidates 1301 generated in S1105 are multiplied by an element product. In this way, M template features 1302 at time t obtained by weighting are generated. The template updating unit 117 stores the template feature 1302 obtained by weighting in the template storage unit 119.

In S1107, the target image acquisition unit 112 acquires the target image from the image at time t+1 acquired in S1101. The target image acquisition unit 112 can cut out the target image from the image at time t+1 by a method similar to that in S305 on the basis of the object information of the tracking target in the image at time t.

Figure 14:
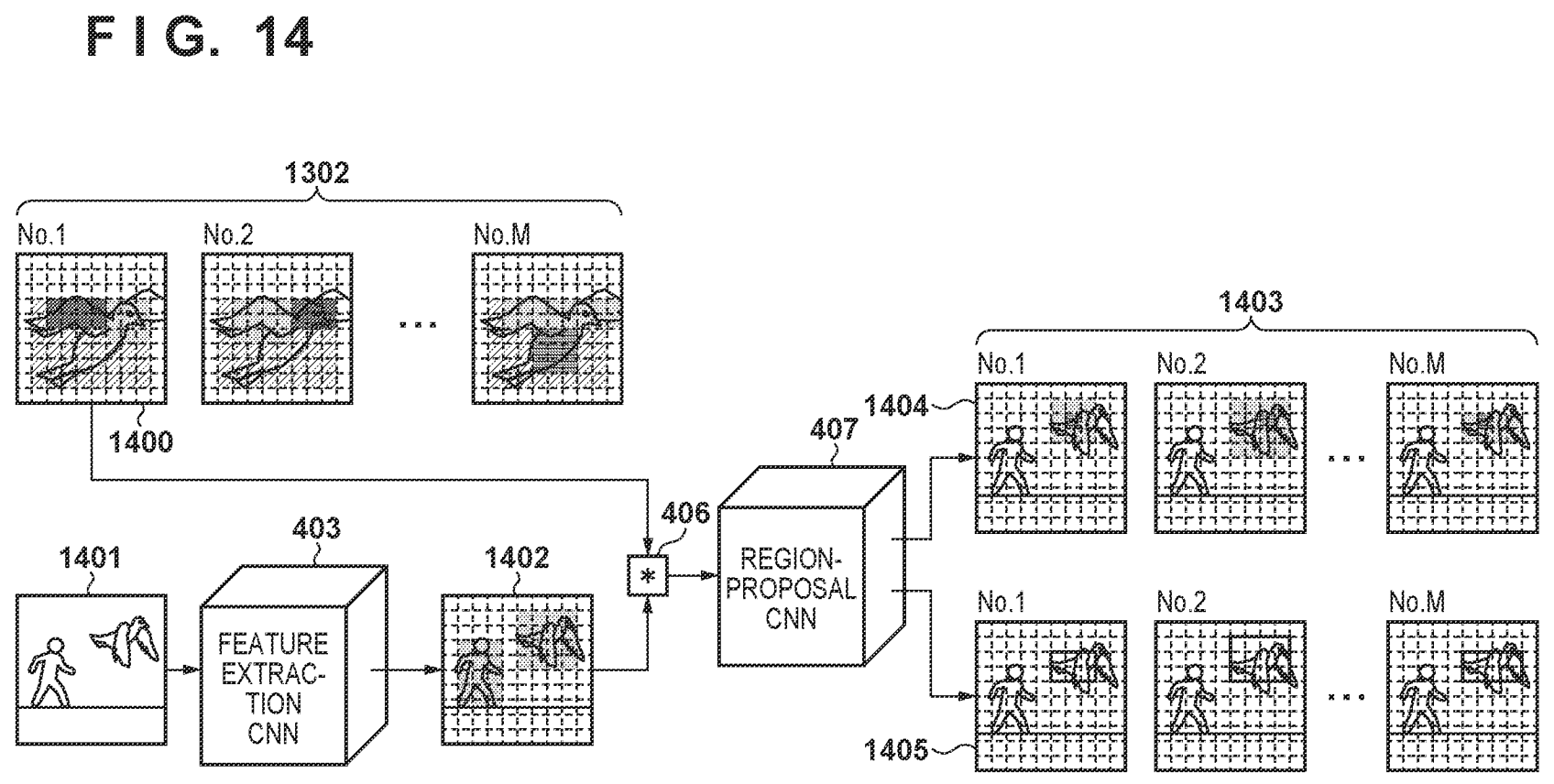

S1108 is a loop for each of the plurality of template features. That is, the tracking target is detected in S1109 using each of the plurality of template features obtained by the weighting in S1106. For example, in S1109, the tracking target is detected from the target image at time t+1 acquired in S1107 by using the M template features at time t generated in S1106 one by one. In the example of FIG. 14, the tracking target is detected using each of the M template features 1302 at time t.

In S1109, the collation unit 114 and the detection unit 115 detect the tracking target from the training target image. This process can be performed similarly to S307 to S309.

This process will be described with reference to FIG. 14. The collation unit 114 and the detection unit 115 perform tracking process using one of the M template features 1302 at time t, for example, the template feature 1400 of No. 1 and the search feature 1402 obtained from the target image. As a result, the likelihood map 1404 and the size map 1505 of No. 1 are output. By performing this process using all of the M template features 1302, M likelihood maps and size maps 1403 are output. The output likelihood map and size map are output to the evaluation unit 1014.

In S1110, the evaluation unit 1014 evaluates the detection result of the tracking target obtained in S1109. In this example, the evaluation unit 1014 evaluates the result of the tracking process on the target image at time t+1. First, the evaluation unit 1014 determines the center position and the size of the tracking target in the target image on the basis of the object information on the image at time t+1. Then, the evaluation unit 1014 generates supervisory data indicating true values of the likelihood map and the size map corresponding to the target image. Then, the evaluation unit 1014 calculates an error between the detection result (likelihood map and size map) of the tracking target obtained in step S1109 and the supervisory data. The evaluation results respectively corresponding to the M weight maps obtained in S1105 are obtained by performing such an evaluation on the results of the M tracking process (the likelihood maps and the size maps). The evaluation unit 1014 outputs the evaluation result to the supervisory data generation unit 1013.

The evaluation method in S1110 will be described with reference to FIG. 15. First, the evaluation unit 1014 creates the likelihood map 1501 and the size map 1502 as true values of the detection result corresponding to the target image at the time t+1. Such a likelihood map is created on the basis of the position of the tracking target in the image given in advance. For example, the likelihood map may have a value following a Gaussian distribution having a peak at the center position of the tracking target in the image. The likelihood map created in this manner has the likelihood that the tracking target is present as a value for each position in the image. On the other hand, the size map is created on the basis of the center position and the size of the tracking target in the image given in advance. For example, the region of the tracking target in the image can be determined based on the center position and the size of the tracking target. The size map may then be generated such that the size map has a value indicative of the size of the object in this region. The size map created in this manner has, as a value, the size of the tracking target present at each position in the image at each position.

Finally, the evaluation unit 1014 calculates an error between the tracking process result and the true value. The error value for one likelihood map 1404 and size map 1405 of the M likelihood maps and size maps can be calculated as follows. The evaluation unit 1014 inputs the likelihood map 1501 and the size map 1502 indicating true values and the likelihood map 1404 and the size map 1405 indicating detection results to the error calculation function 1503, thereby obtaining an error value 1504 as an output. In the error calculation function 1503, a cross entropy error between the likelihood map 1404 indicating the detection result and the likelihood map 1501 indicating the true value is calculated. In the error calculation function 1503, a cross entropy error between the size map 1405 indicating the detection result and the size map 1505 indicating the true value is further calculated. Then, the sum of the error of the likelihood map and the error of the size map is output as an error value 1504.

The evaluation unit 1014 acquires the error values 1500 of the M detection results as a result by performing such error value calculation process on each of the size maps 1403 indicating the M detection results. A smaller error value indicates that the likelihood and the size the tracking target is present are correctly estimated, that is, the result of the tracking process is evaluated to be better. Note that the training of the tracking model described above can also be performed using, for example, the error reverse propagation method on the basis of the error between the detection result and the true value of the detection result obtained in this manner.

In S1111, the supervisory data generation unit 1013 determines the weight map of the feature used as the true value from the plurality of candidates for the weight map of the feature generated in S1105. For example, the supervisory data generation unit 1013 can determine a weight map to be used as a true value from the candidates of the weight map obtained in S1105. The process in S1111 will be described with reference to FIG. 16. In S1110, an error value 1500 indicating the evaluation of the detection result by the tracking process performed using each of the M weight map candidates 1301 generated in S1105 is calculated. The supervisory data generation unit 1013 searches for the minimum error value among the M error values 1500. Then, the supervisory data generation unit 1013 selects the weight map 1601 used in the tracking process corresponding to the minimum error value 1600 as the weight map of the true value. The weight map selected by the supervisory data generation unit 1013 is output to the model training unit 1012.

In S1112, the weight generation unit 116 generates the weight map using the reference image at time t and the reference image at time t−1 stored in the reference image storage unit 118, and the reference image at time t stored in the template storage unit 119. This process can be performed using the weight map generation model, similar to S313. In the example of FIG. 17, the feature 1300 of the reference image 1701 at time t−1 and the reference image 1702 at time t obtained in S1103 and the reference image at time t obtained in S1104 is input to the weight map generation CNN 800. Then, the weight map generation CNN 800 generates the weight map 1703 through processes similar to that in S313. The generated weight map is output to the model training unit 1012.

In S1113, the model training unit 1012 trains the weight map generation model used by the weight generation unit 116. In the example of FIG. 17, the model training unit 1012 evaluates an error between the weight map 1601 of the true value obtained in S1111 and the weight map 1703 generated by the weight map generation model in S1112. The model training unit 1012 can calculate an error value 1705 between the weight map 1601 and the weight map 1703 using the error calculation function 1704. The error calculation function 1704 can obtain the error value 1705 by calculating the cross entropy error. Furthermore, the model training unit 1012 updates the parameter of the weight map generation model on the basis of the evaluation result of the error between the weight map 1601 and the weight map 1703. For example, the model training unit 1012 can update the parameter of the weight map generation model by reverse propagating the obtained error value 1705 to the neural network used by the weight map generation model. The model training unit 1012 stores the updated parameters of the weight map generation model in the weight model storage unit 121.

The weight map generation model is trained by repeatedly performing the training process illustrated in FIG. 11 as described above using various images stored in the evaluation database 1010. This training process can be performed using a large number of moving images stored in the evaluation database 1010. According to such training process, the weight map generation model can be trained so as to generate the weight map that can improve the detection accuracy of the tracking target. Since the weight map generation model generates the weight map on the basis of the time-series images, it is considered that the weight map generation model trained by such training process can generate the weight map in consideration of the change in the time-series images. For example, the weight map for the feature of the image corresponding to the time-series change in the images of the tracking target can be acquired by using the weight map generation model trained by the training process as described above. As the time-series change, various changes such as a moving direction, a movement amount, a color, and a pattern can be considered. On the other hand, according to the method of the present embodiment, the weight generation ability corresponding to the time-series change is automatically acquired at the time of training. Therefore, the robustness of the tracking process with respect to the time-series change of the tracking target can be improved by weighting the feature of the reference image indicating the tracking target with the weight map generated by the weight map generation model.

(Weighting Based on More Time-Series Images)

In the above embodiment, the weight generation unit 116 generates the weight of the feature based on the two time-series images (reference images). On the other hand, the weight generation unit 116 may generate the weight of the feature on the basis of more than two time-series images. For example, the weight generation unit 116 may generate the weight of the feature for each of the plurality of positions of the first image of the tracking target further based on the third image of the tracking target at the third time in addition to the first image and the second image. According to such a configuration, the weight of the feature can be generated in consideration of the change in the time series of the tracking target over a longer time.

A method of generating a weight of a feature in such an embodiment will be described with reference to FIG. 18. FIG. 18 illustrates a weight map generation CNN 800 used as a weight map generation model. The weight map generation CNN 800 receives the reference image group 1810 of the past time, the reference image 1811 of the current time, and the feature 1812 obtained by inputting the reference image 1811 of the current time to the feature extraction CNN 403. For example, the reference image 1811 at the current time is the reference image at time t. The reference image at time t is obtained by cutting out the detected region of the tracking target from the target image at time t. The reference image group 1810 of the past time is a reference image before time t (e.g., time t−1, t−2, . . . ) The reference image group 1810 can also be obtained by cutting out the region of the tracking target from the target image of the past time. In the weight map generation CNN 800 illustrated in FIG. 18, the reference image group 1810 of the past time and the reference image 1811 of the current time can be combined in the channel direction. Then, the weight map 1813 is generated by performing processes similar to those in FIG. 8 on the combined images.

The tracking process and the template update process in such an embodiment can also be performed according to the methods illustrated in FIGS. 3B to 3C. In this embodiment, in S310, the reference image acquisition unit 111 acquires reference images at a plurality of past times (four times in the following example) from the reference image storage unit 118. In addition, in S313, the weight generation unit 116 generates the weight map by inputting the reference image at the past four times, the reference image at the current time, and the feature of the reference image at the current time to the weight map generation model. Such processing can be performed after the image processing apparatus 100 performs tracking process on images at five times. The other processes are similar to those already described.

Furthermore, training of the weight map generation model in such an embodiment can also be performed according to the method illustrated in FIG. 11. In the case of this embodiment, in S1101, the evaluation database 1010 acquires images of consecutive N+2 frames and object information for each image. The value of N is determined according to the number of images used to calculate the weight. In this example, N=4, but the value of N is not limited to 4. Furthermore, in S1102, the evaluation database 1010 determines an object captured in all the images of the N+2 frames as a tracking target. Here, among the images of the N+2 frames, the latest image is referred to as an image at time t+1, an image at an older time is referred to as an image at time t, and an image further at an older time is referred to as an image at time t−n (n=1, 2, . . . , N).

In S1103, the reference image acquisition unit 111 acquires a reference image from each of the images of N+2 frames. In S1112, the weight generation unit 116 generates the weight map as illustrated in FIG. 18 using the reference image at time t, the reference image at time t-n (n=1, 2, . . . , N), and the feature of the reference image at time t. The other processes are similar to those already described.

According to such a method, it is possible to obtain the weight of the feature in consideration of the time-series change of the tracking target over a longer time. Then, the robustness of the tracking process with respect to the time-series change of the tracking target can be further improved by weighting the feature of the reference image indicating the tracking target with the weight of the feature obtained by such a method.

(Weighting Using a Plurality of Weights)

In the above embodiment, the weighting of the feature is performed using the weight generated by the weight generation unit 116 for each of the plurality of positions. On the other hand, the weight generation unit 116 may generate two or more weights for each of the plurality of positions. For example, the weight generation unit 116 may generate a plurality of weights of the feature for each of a plurality of positions of the first image of the tracking target using each of a plurality of methods. In this case, the collation unit 114 and the detection unit 115 can detect the tracking target from the target image by using the feature of the first image of the tracking target weighted on the basis of each of the plurality of weights. As a specific example, the weight generation unit 116 may generate a plurality of weight maps. Hereinafter, a case where the weight generation unit 116 outputs a plurality of weight maps having different reaction targets will be described.

In the following example, the weight generation unit 116 generates a motion weight map and a tracking target weight map. The motion weight map is generated so as to indicate a small weight in a portion where the change in the posture of the object is large and a large weight in a portion where the change in the posture of the object is small. In addition, the tracking target weight map is generated so as to indicate a small weight in a portion where an object other than the tracking target is present and a large weight in a portion where the tracking target is present. The tracking target weight map can be generated so as to indicate a small weight even in the background portion.

A weight map generation model used in such an embodiment will be described with reference to FIG. 19A. This weight map generation model is trained to generate a plurality of weight maps using a plurality of convolutional neural networks that output different weight maps. Such a weight map generation model is realized by the weight map generation CNN 1900. The feature 1912 of the reference image at time t obtained by inputting the reference image 1910 at time t–1, the reference image 1911 at time t, and the reference image 1911 at time t to the feature extraction CNN 403 is input to the weight map generation CNN 1900. The combining process 801, the convolution layer 802, the activation function 803, the pooling process 804, and the combining process 805 are similar to the weight map generation CNN 800.

The intermediate feature obtained in the combining process 805 is input to each of the motion weight map generation CNN 1902 and the tracking target weight map generation CNN 1903. The motion weight map generation CNN 1902 outputs the motion weight map 1913. The motion weight map 1913 indicates a weight based on the estimated value of the magnitude of the time-series change of the image of the tracking target. For example, the motion weight map 1913 may indicate a small weight in a region 1916 of the bird's wing with large motion and a small weight in a region 1915 of the face with little motion. The tracking target weight map generation CNN 1903 outputs the tracking target weight map 1914. The tracking target weight map 1914 indicates a weight based on the presence likelihood of the tracking target. For example, the tracking target weight map 1914 indicates a large weight in a region where the tracking target is present and a small weight in a background region. These CNNs 1902, 1903 have the configuration illustrated in FIG. 19B. That is, in the CNNs 1902 and 1903, the convolution operation in the convolution layer 806 and the operation using the activation function 807 are performed, similarly to the weight map generation CNN 800 illustrated in FIG. 8.

In this case, the collation unit 114 and the detection unit 115 can detect the tracking target from the target image using the feature of the first image of the tracking target weighted using the plurality of weight maps.

The tracking process and the template update process in such an embodiment can also be performed according to the methods illustrated in FIGS. 3B to 3C. In the case of this embodiment, in S313, the weight generation unit 116 outputs the motion weight map 1913 and the tracking target weight map 1914 using the weight map generation CNN 1900. Furthermore, in S314, the template updating unit 117 weights the feature of the reference image at time t generated in S312 using the motion weight map 1913 and the tracking target weight map 1914 generated in S313.

The process of S314 will be described with reference to FIG. 20. The template updating unit 117 can weight the feature of the reference image at time t by multiplying each weight map. For example, the template updating unit 117 multiplies the feature 1912 of the reference image at time t, the motion weight map 1913, and the tracking target weight map 1914 by the element product 900. As a result, a weighted feature 2001 is obtained. The other processes are similar to those already described.

The robustness of the tracking process with respect to the time-series change of the tracking target can be improved by using the plurality of weight maps in this manner. For example, by using the motion weight map and the tracking target weight map as described above, weighting that takes into consideration only the magnitude of the motion of the tracking target can be performed excluding the influence of the reflection of objects other than the tracking target and the background.

Next, a training apparatus of the weight map generation model used in this embodiment will be described. FIG. 21 illustrates a functional configuration example of a training apparatus 2100 according to the present embodiment. The training apparatus 2100 includes an evaluation database 1010, a model training unit 1012, and a supervisory data generation unit 2101. The evaluation database 1010 and the model training unit 1012 have functions similar to those in FIG. 10. The supervisory data generation unit 2101 generates supervisory data used for training of the weight map generation model. The supervisory data indicates a true value of the weight map used as the true value.

The training process of the weight map generation model in such an embodiment will be described with reference to the processing flow illustrated in FIG. 22. The processes from S1101 to S1104 are performed in the same manner as in FIG. 11.

In S2201, the supervisory data generation unit 2101 acquires the reference image at time t and the reference image at time t−1 from the reference image storage unit 118. Furthermore, the supervisory data generation unit 2101 acquires the object information about time t from the evaluation database 1010. Then, the supervisory data generation unit 2101 generates supervisory data to be used for training of the motion weight map generation CNN 1902 using the acquired reference image of time t and the acquired reference image of time t−1. In addition, the supervisory data generation unit 2101 generates supervisory data to be used for training of the tracking target weight map generation CNN 1903 by using the reference image at time t and the object information at time t. The supervisory data generated by the supervisory data generation unit 2101 is a one-channel map having the same height and width as the feature of the reference image at time t generated by the feature generation unit 113.

First, a method of generating supervisory data used for training of the motion weight map generation CNN 1902 will be described with reference to FIG. 23A. The supervisory data generation unit 2101 can generate supervisory data of a motion weight map on the basis of time-series images including a reference image (first training image) at time t. The supervisory data generation unit 2101 can generate such supervisory data such that a weight at a position where the time-series change of the image of the tracking target is small is larger than a weight at a position where the time-series change of the image of the tracking target is large.

In one example, the supervisory data generation unit 2101 first calculates a motion vector between images by the motion vector calculation process 2302 using the reference image 2300 at time t−1 and the reference image 2301 at time t. The motion vector calculation process 2302 can be performed using, for example, a method described in Farnebaeck (G. Farnebaeck "Two-Frame Motion Estimation Based on Polynomial Expansion", Scandinavian Conference on Image Analysis 2003). The motion vector calculation processing 2302 calculates a motion vector indicating the movement amount and the moving direction between the two images for each position. An image in which the calculated motion vector is shown is shown on the reference image 2301 at time t as an image 2303 in FIG. 23A. The image 2303 indicates that the motion vector in the face region 2304 with little motion is small and the motion vector in the wing region 2305 with large motion is large.

Next, the supervisory data generation unit 2101 performs aggregation process 2306 of the magnitude of the motion vector. In the aggregation process 2306, the supervisory data generation unit 2101 can divide the reference image 2301 at time t according to the grid, and aggregate the magnitude of the motion vector for each small region. For example, the supervisory data generation unit 2101 can calculate an average value of the magnitude of the motion vectors in the small region. As a result of the aggregation process 2306, a map representing the magnitude of the motion of the object is obtained for each small region. Here, this grid may be determined according to the feature of the reference image at time t. For example, the size of each small region may match the size of a partial region of the reference image at time t corresponding to one element of the feature of the reference image at time t.

Finally, a map indicating a weight corresponding to the magnitude of the motion is generated by the weight application process 2307. In the weight application process 2307, the weight map 2308 can be generated by normalizing the value of the map representing the magnitude of the motion obtained by the aggregation process 2306 between 0 and 1.

This map is used as supervisory data indicating a true value of the motion weight map. The weight map 2308 generated in this manner indicates a large weight in a face region with little motion and a small weight in a wing region with large motion.

Next, a method of generating supervisory data used for training of the tracking target weight map generation CNN 1903 will be described with reference to FIG. 23B. The supervisory data generation unit 2101 can generate the supervisory data of the tracking target weight map such that the weight at the position where the tracking target is present becomes larger than the weight at the position where the tracking target is not present.

In one example, the supervisory data generation unit 2101 first performs an initialization process 2311 of the weight map. Through this process, the supervisory data generation unit 2101 generates a one-channel map having the same height and width as those of the reference image 2301. The value of each element of the generated map is 0.

Next, the supervisory data generation unit 2101 creates a mask indicating a region of the tracking target. The supervisory data generation unit 2101 uses the reference image 2301 at time t and the object information acquired from the evaluation database 1010 to distinguish the tracking target on the reference image 2301 from other objects. FIG. 23C illustrates a state in which the region of the object 2309 and the region of the object 2310 on the reference image 2301 are separated on the basis of the position, size, and identification number of the object stored in the evaluation database 1010. Furthermore, the supervisory data generation unit 2101 can determine that the object 2310 is the tracking target based on the information of the tracking target determined by the evaluation database 1010 in S1102. On the basis of these pieces of information, the supervisory data generation unit 2101 executes the mask process 2312 on the weight map generated by the initialization process 2311. In the mask process 2312, 1 is given as a weight value to a portion corresponding to a region of the tracking target in the weight map. Furthermore, 0 is given as a weight value to a portion that does not correspond to the region of the tracking target in the weight map. The mask 2313 created by such mask process 2312 is used as supervisory data indicating the true value of the tracking target weight map.

In S2202, the weight generation unit 116 generates a weight map similarly to S1112. In the present embodiment, each of the motion weight map and the tracking target weight map is generated by the process using the weight map generation CNN 1900.

In S2203, the model training unit 1012 trains the weight map generation model. First, the model training unit 1012 evaluates an error between the supervisory data obtained in S2201 and the weight map obtained in S2202. For example, the model training unit 1012 can calculate an error value between the true value of the motion weight map obtained in S2201 and the motion weight map obtained in S2202. Furthermore, the model training unit 1012 can calculate an error value between the true value of the tracking target weight map obtained in S2201 and the tracking target weight map obtained in S2202. Here, a cross entropy error can be used as the error value. Next, the model training unit 1012 calculates the sum of the error value calculated for the motion weight map and the error value calculated for the tracking target weight map. The sum of the error values thus obtained can be used as the error value of the weight map generation model. The parameter of the weight map generation model can be updated by reverse propagating the error value thus obtained to the weight map generation CNN 1900 using the error reverse propagation method. The model training unit 1012 stores the updated parameters of the weight map generation model in the weight model storage unit 121.

The weight map generation model is trained by repeatedly performing the training process illustrated in FIG. 11 as described above using various images stored in the evaluation database 1010.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-147206, filed Sep. 15, 2022, which is hereby incorporated by reference herein in its entirety.

What is claimed is:

1. An image processing apparatus that searches for a tracking target from a target image, the image processing apparatus comprising one or more memories storing instructions and one or more processors that execute the instructions to:

acquire a feature map of the target image and a feature map of a first image of the tracking target at a first time;

generate a weight map of the feature map of the first image of the tracking target on the basis of the first image of the tracking target and a second image of the tracking target at a second time, wherein the weight map reflects a magnitude of a time-series change of the image of the tracking target for each position of the first image; and detect the tracking target from the target image on the basis of a correlation between the feature map of the target image and the feature map of the first image of the tracking target weighted on the basis of the weight map.

2. The image processing apparatus according to claim 1, wherein the second image, the first image, and the target image are captured in this order.

3. The image processing apparatus according to claim 1, wherein the one or more processors execute the instructions to generate the weight map further based on a third image of the tracking target at a third time.

4. The image processing apparatus according to claim 1, wherein the one or more processors execute the instructions to generate the first image of the tracking target from a past target image based on a detection result of the tracking target from the past target image at the first time.

5. The image processing apparatus according to claim 1, wherein the one or more processors execute the instructions to generate the weight map such that a weight at a position where a time-series change of the image of the tracking target is relatively small is larger than a weight at a position where a time-series change of the image of the tracking target is relatively large.

6. The image processing apparatus according to claim 5, wherein the one or more processors execute the instructions to generate the weight map so that the weight changes depending on whether or not the tracking target is present.

7. The image processing apparatus according to claim 1, wherein the one or more processors execute the instructions to generate the weight map based on the first image of the tracking target, the second image of the tracking target, and the feature map of the first image of the tracking target.

8. The image processing apparatus according to claim 1, wherein the one or more processors execute the instructions to:

generate a plurality of weight maps of the feature map using each of a plurality of methods; and detect the tracking target from the target image using the feature map of the first image of the tracking target weighted based on each of the plurality of weight maps.

9. The image processing apparatus according to claim 1, wherein the one or more processors execute the instructions to generate the weight map using a weight map generation model.

10. The image processing apparatus according to claim 9, wherein the weight map generation model is trained to generate the weight map using a convolutional neural network.

11. The image processing apparatus according to claim 9, wherein the weight map generation model is trained to generate a plurality of weight maps by using a plurality of convolutional neural networks that output different weight maps; and the one or more processors execute the instructions to detect the tracking target from the target image using the feature map of the first image of the tracking target weighted using the plurality of weight maps.

12. The image processing apparatus according to claim 11, wherein the plurality of weight maps include a weight map indicating a weight based on an estimated value of a magnitude of a time-series change of the image of the tracking target and a weight map indicating a weight based on a presence likelihood of the tracking target.

13. An image processing apparatus that searches for a tracking target from a target image, the image processing apparatus comprising one or more memories storing instructions and one or more processors that execute the instructions to:

acquire a feature map of the target image and a feature map of a first image of the tracking target at a first time;

generate a weight map of the feature map of the first image of the tracking target on the basis of a time-series change in an image of the tracking target; and detect the tracking target from the target image on the basis of a correlation between the feature map of the target image and the feature map of the first image of the tracking target weighted on the basis of the weight map.

14. A training apparatus that trains a weight map generation model, the training apparatus comprising one or more memories storing instructions and one or more processors that execute the instructions to:

acquire a weight map of a feature map of a first training image obtained by inputting the first training image of a tracking target, a second training image of the tracking target, and the feature map of the first training image to the weight map generation model;

evaluate an error between the weight map of the feature map of the first training image and supervisory data of the weight map of the feature map of the first training image; and update the weight map generation model based on an evaluation result of the error, wherein the weight map generation model is used by an image processing apparatus that searches for a tracking target from a target image, the image processing apparatus comprising one or more memories storing instructions and one or more processors that execute the instructions to:

acquire a feature map of the target image and a feature map of a first image of the tracking target at a first time;

generate a weight map indicating a weight of the feature map for each of a plurality of positions of the first image of the tracking target on the basis of the first image of the tracking target and a second image of the tracking target at a second time using the weight map generation model; and detect the tracking target from the target image on the basis of a correlation between the feature map of the target image and the feature map of the first image of the tracking target weighted on the basis of the weight map.

15. The training apparatus according to claim 14, wherein the one or more processors execute the instructions to:

evaluate a detection result of the tracking target from a training target image based on a correlation between a feature map of the training target image and a feature map of the first training image of the tracking target weighted based on the weight map; and generate the supervisory data of the weight map of the feature map of the first training image on the basis of a weight map selected from the plurality of weight maps on the basis of an evaluation result by the evaluation of the detection result of the tracking target performed using each of the plurality of weight maps.

16. The training apparatus according to claim 15, wherein the one or more processors execute the instructions to generate the plurality of weight maps each having the same spatial size as a feature map of the training target image and having a random value.

17. The training apparatus according to claim 14, wherein the one or more processors execute the instructions to generate supervisory data of a weight map of a feature map of the first training image based on a time-series image including the first training image such that a weight at a position where a time-series change of the image of the tracking target is relatively small is larger than a weight at a position where a time-series change of the image of the tracking target is relatively large.

18. The training apparatus according to claim 17, wherein the one or more processors execute the instructions to further generate additional supervisory data of the weight map of the feature map of the first training image so that a weight at a position where the tracking target is present is larger than a weight at a position where the tracking target is not present.

19. An image processing method for searching for a tracking target from a target image, comprising:

acquiring a feature map of the target image and a feature map of a first image of the tracking target at a first time;

generating a weight map of the feature map of the first image of the tracking target on the basis of the first image of the tracking target and a second image of the tracking target at a second time, wherein the weight map reflects a magnitude of a time-series change of the image of the tracking target for each position of the first image; and detecting the tracking target from the target image on the basis of a correlation between the feature map of the target image and the feature map of the first image of the tracking target weighted on the basis of the weight map.

20. A non-transitory computer-readable medium storing a program executable by a computer to perform a method for searching for a tracking target from a target image, the method comprising:

acquiring a feature map of the target image and a feature map of a first image of the tracking target at a first time;

generating a weight map of the feature map of the first image of the tracking target on the basis of the first image of the tracking target and a second image of the tracking target at a second time, wherein the weight map reflects a magnitude of a time-series change of the image of the tracking target for each position of the first image; and detecting the tracking target from the target image on the basis of a correlation between the feature map of the target image and the feature map of the first image of the tracking target weighted on the basis of the weight map.

21. A training method for training a weight map generation model, comprising:

acquiring a weight map of a feature map of a first training image obtained by inputting the first training image of a tracking target, a second training image of the tracking target, and the feature map of the first training image to the weight map generation model;

evaluating an error between the weight map of the feature map of the first training image and supervisory data of the weight map of the feature map of the first training image; and updating the weight map generation model based on an evaluation result of the error, wherein the weight map generation model is used in an image processing method for searching for a tracking target from a target image, the image processing method comprising:

acquiring a feature map of the target image and a feature map of a first image of the tracking target at a first time;

generating a weight map indicating a weight of the feature map for each of a plurality of positions of the first image of the tracking target on the basis of the first image of the tracking target and a second image of the tracking target at a second time using the weight map generation model; and detecting the tracking target from the target image on the basis of a correlation between the feature map of the target image and the feature map of the first image of the tracking target weighted on the basis of the weight map.

22. A non-transitory computer-readable medium storing a program executable by a computer to perform a method for training a weight map generation model, the method comprising:

acquiring a weight map of a feature map of a first training image obtained by inputting the first training image of a tracking target, a second training image of the tracking target, and the feature map of the first training image to the weight map generation model;

evaluating an error between the weight map of the feature map of the first training image and supervisory data of the weight map of the feature map of the first training image; and updating the weight map generation model based on an evaluation result of the error, wherein the weight map generation model is used in an image processing method for searching for a tracking target from a target image, the image processing method comprising:

acquiring a feature map of the target image and a feature map of a first image of the tracking target at a first time;

generating a weight map indicating a weight of the feature map for each of a plurality of positions of the first image of the tracking target on the basis of the first image of the tracking target and a second image of the tracking target at a second time using the weight map generation model; and detecting the tracking target from the target image on the basis of a correlation between the feature map of the target image and the feature map of the first image of the tracking target weighted on the basis of the weight map.

* * * * *